(12) United States Patent
Kazmer et al.

(10) Patent No.: US 8,753,553 B2
(45) Date of Patent: Jun. 17, 2014

(54) METHODS FOR FORMING INJECTED MOLDED PARTS AND IN-MOLD SENSORS THEREFOR

(75) Inventors: David Kazmer, North Andover, MA (US); Rahul Panchal, Eden Prairie, MN (US); Stephen Johnston, Ashville, NY (US)

(73) Assignee: University of Massachusetts, Boston, MA (US)

( * ) Notice: Subject to any disclaimer, the term of this patent is extended or adjusted under 35 U.S.C. 154(b) by 264 days.

(21) Appl. No.: 12/937,639

(22) PCT Filed: Apr. 14, 2009

(86) PCT No.: PCT/US2009/040508
§ 371 (c)(1),
(2), (4) Date: Dec. 28, 2010

(87) PCT Pub. No.: WO2009/129230
PCT Pub. Date: Oct. 22, 2009

(65) Prior Publication Data
US 2011/0101555 A1   May 5, 2011

Related U.S. Application Data

(60) Provisional application No. 61/044,698, filed on Apr. 14, 2008.

(51) Int. Cl.
*B29C 45/76* (2006.01)
*B29C 45/80* (2006.01)

(52) U.S. Cl.
USPC ......... 264/40.1; 264/40.5; 425/149; 425/150; 425/170

(58) Field of Classification Search
CPC .......... B29C 2945/76006; B29C 2945/76103; B29C 2945/76257; B29C 2945/76384; B29C 2945/76391; B29C 2945/76414
USPC ............ 264/40.1, 40.5, 40.6, 328.7; 425/170, 425/149, 150
See application file for complete search history.

(56) References Cited

U.S. PATENT DOCUMENTS 4,369,659 A   1/1983   Wareham
4,585,408 A   4/1986   Darr
(Continued)

FOREIGN PATENT DOCUMENTS

| JP | 11224275 A | 8/1999 |
| JP | 2003103565 A | 4/2003 |
| JP | 2003326581 A | 11/2003 |

OTHER PUBLICATIONS

International Search Report for PCT/US2009/040508, 4 pages, dated Nov. 30, 2009.

*Primary Examiner* — Jill Heitbrink
(74) *Attorney, Agent, or Firm* — Wolf, Greenfield & Sacks, P.C.

(57) ABSTRACT

A method for use in forming a molded part includes providing a mold having a cavity and a movable pin, injecting a moldable material into the cavity, biasing the movable pin to maintain an end of the movable pin in contact with the moldable material in the cavity during the curing of the moldable material and until the moldable material is cured, and monitoring movement of the biased movable pin during curing of the moldable material in the mold. Also disclosed is a sensor engageable with an end of a movable pin of a mold for monitoring the forming of a moldable part, and systems employing the same.

37 Claims, 19 Drawing Sheets

(56) References Cited

U.S. PATENT DOCUMENTS

| | | |
|---|---|---|
| 4,816,197 A | 3/1989 | Nunn |
| 5,015,426 A | 5/1991 | Maus et al. |
| 5,078,007 A | 1/1992 | Tadros |
| 5,238,380 A | 8/1993 | Wenskus, Jr. et al. |
| 5,244,372 A | 9/1993 | Ramsey et al. |
| 5,256,345 A | 10/1993 | Yokota |
| 5,427,516 A | 6/1995 | Bader et al. |
| 5,519,211 A | 5/1996 | Bur et al. |
| 5,540,577 A | 7/1996 | Ishikawa et al. |
| 5,602,339 A | 2/1997 | Wareham |
| 6,048,476 A | 4/2000 | Lausenhammer et al. |
| 6,247,521 B1 | 6/2001 | Kawai et al. |
| 6,299,349 B1 * | 10/2001 | Steinel et al. ............... 374/143 |
| 6,649,095 B2 | 11/2003 | Buja |
| 6,709,257 B2 | 3/2004 | Foreman et al. |
| 6,723,261 B2 | 4/2004 | Harper |
| 7,094,376 B2 * | 8/2006 | Schmidt ..................... 264/328.8 |
| 7,204,149 B1 | 4/2007 | Steil et al. |
| 7,293,981 B2 | 11/2007 | Niewels |
| 7,323,125 B2 | 1/2008 | Uwaji et al. |
| 7,410,354 B2 * | 8/2008 | Olaru ........................... 425/564 |
| 7,425,985 B2 | 9/2008 | Kawai |
| 7,585,166 B2 * | 9/2009 | Buja ............................ 425/143 |
| 7,722,792 B2 * | 5/2010 | Uezaki et al. ............. 264/328.7 |
| 2006/0246167 A1 | 11/2006 | Buja |

* cited by examiner

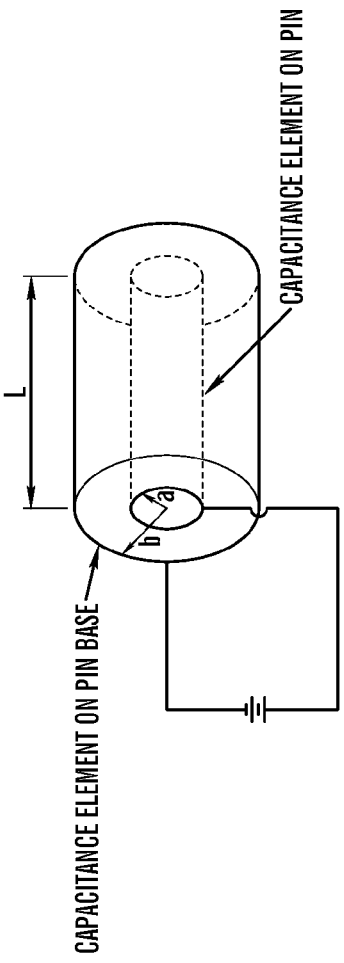
FIG. 20
FIG. 21
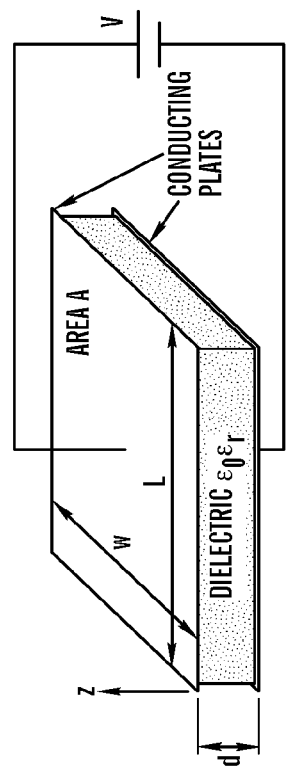
FIG. 23
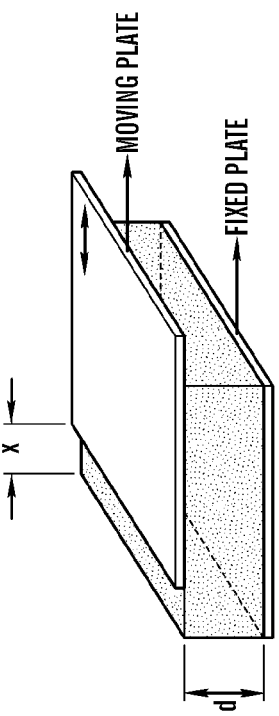
FIG. 22

METHODS FOR FORMING INJECTED MOLDED PARTS AND IN-MOLD SENSORS THEREFOR

CLAIM TO PRIORITY

This application is a 371 national stage filing of PCT International Application No. PCT/US2009/040508 filed on Apr. 14, 2009, and published in English on Oct. 22, 2009, as WO 2009/129230, which claims the benefit of U.S. Provisional Application No. 61/044,698, filed Apr. 14, 2008, entitled "Methods For Forming Injected Molded Parts And In-Mold Sensors Therefor," the entire subject matter these applications being hereby incorporated herein by reference.

FIELD OF THE INVENTION

This invention relates generally to high fidelity systems for dimensional control of injection molded products, and more specifically, to sensors designed to measure in-mold part dimensions and cavity pressures, and mechanistic analyses used to predict the final molded part dimensions, perform control actions, and synthesize alternative feasible processes.

BACKGROUND OF THE INVENTION

Plastics manufacturing has made continuous gains in capability and competitiveness. Many industry advancements have been fueled by technological progress related to process analysis, instrumentation, and control. FIG. 1 is a prior art closed-loop injection molding machine 10 with varying levels of feedback. It is generally recognized that feedback about the process may be provided by pressure and temperature sensors 12 disposed on the nozzle, as well as a barrel temperature sensor 14 placed in the machine. In addition, current molding controller technology also relies on machine feedback employing sensors such as a hydraulic pressure sensor 16 placed behind the screw, screw position sensors and screw velocity sensors 18, clamp force sensor 20, limit switches 22, melt pressure and melt temperature flow-rate sensors 24, and others sensors.

Polymer processing provides for the mass production of a wide range of economical yet complex products. In injection molding, thermoplastic feedstock in the form of pellets is melted through conduction and viscous dissipation to form a homogeneous melt. Once a melt is collected, it is forced into a mold to form the desired complex shape. The replication and final dimensions of the molded part relative to the mold cavity is related to the shrinkage of the polymer as it cools inside and outside of the mold. Shrinkage is a complex function of 1) the size, shape, and wall thickness of the part design, 2) the free volume, morphology, and material properties of the polymeric resin, 3) the details of the mold including feed system and cooling system design, and 4) the molding conditions such as flow rates, packing pressures, melt and mold temperatures, timings, etc.

The ability to predict and control shrinkage is directly related to the consistency of the molded part dimensions and the usefulness of the molded part, especially in tight tolerance applications which is often employed. For example, commercial and fine tolerances of 0.3% and 0.15% of the overall length dimension for polycarbonate (PC) is often employed. Material shrinkage is characterized by standard tests including ASTM D955-00 and ISO 294-4. However, these standards are typically applied to a tensile bar with a wall thickness of 3.2 mm and assumed process conditions. As such, the final shrinkage and part dimensions in industry applications may vary substantially from those reported. Product designers, mold designers, and molders employ methods to hedge errors in shrinkage rates, yet standard dimensional tolerances as specified by the Society of the Plastics Industry have not changed in the past thirty years.

Technological capabilities of the industry have improved since 1970 when many plastics molding machines still used open-loop control for most subsystems. Since the advent of programmable logic control, the majority of machine input variables have become individually controlled via single-input single-output PID (proportional-integral-derivative) algorithms. Continuing advances in machine and control system designs have greatly improved the time response and absolute repeatability of the process. Similar advances have been made with respect to mold making and polymer synthesis. As a result, tighter tolerances are possible, albeit with an uncertain amount of testing, instrumentation, and processing costs.

There has been increasing recognition that the measurement and control of the polymer state within the mold cavity is vital to product quality. Accordingly, there has been a proliferation of cavity pressure sensors based on load cells, strain gages, and piezoelectric materials. Concurrently, other methods have been developed for measuring melt temperature in the mold including infrared sensors and thermocouples. Ultrasonic methods have also been developed to detect the presence and solidification of the melt in the mold cavity. These sensors provide valuable information that is commonly used with statistical process control to track the process consistency. However, no single control strategy or system design has been universally successful, and defective components continue to be manufactured during high volume production.

To improve the capability of these sensors to predict quality, sensor fusion approaches have incorporated multiple sensor streams with on-line and/or post-molding analyses to predict the part dimensions. The approaches are most often either mechanistic or statistical. Mechanistic approaches vary in complexity from relatively simple analysis of pressure-volume-temperature relations to complex thermo viscoelastic modeling of residual stress relaxation. Statistical models frequently rely on regression, neural networks, or other methods.

One attempt is that of Anthony Bjur of NIST and Charles Thomas of the University of Utah, who developed an optical fiber sensor inserted into the ejector pin channel of a mold using an ejector pin sleeve with a sapphire window at its end. As shown in FIG. 2, a sapphire window 30 was positioned flush with a wall of the mold 32 having a mold cavity 33. A fiber optic cable 34 is position within an ejector pin 36. The fiber optic cable included a bundle of nineteen 100 micron diameter fibers, seven of which carried light from a helium-neon laser 40 and twelve of which transmitted reflected light back to a silicon photodiode 42. In operation, incident light was transmitted through the resin and then reflected back to the detector from every boundary at which there was a discontinuity in the index of refraction. During the molding cycle, the detected light was analyzed to: 1) detect the arrival of the polymer melt, 2) detect separation of the resin from the mold wall upon shrinkage, and 3) monitor the molded part shrinkage as shown in FIG. 3.

More recently, Fathi et al. designed a glass mold and used a high speed camera to observe the shrinkage during the molding process (S. Fathi and A. H. Behravesh, "Visualization of In-Mold Shrinkage in Injection Molding Process," Polymer Engineering & Science, vol. 47, pp. 750-756, 2007). Angstadt et al. have also implemented a glass mold to observe the development of birefringence in injection molding (D.C. Angstadt, C. H. Gasparian, J. P. Coulter, and R. A. Pearson, "In-situ observation of birefringence during vibration-assisted injection molding," SPE ANTEC, vol. 1, pp. 783-787, 2004). The size, cost, and maintenance issues associated with these designs prevent widespread adoption for in-mold shrinkage measurement.

In addition, there have been significant increases in molded part complexity due to the development and widespread implementation of design for manufacturing and assembly (DFMA) guidelines that leverage the capability of the injection molding process. One common DFMA guideline calls for the consolidation of multiple parts whenever possible, which leads to fewer but more complex components. Given such potential functionality arising from complex molded parts, it is currently not uncommon for a molded part, such as an inkjet cartridge, to specify more than thirty critical dimensions with tight tolerances.

There is a need for further sensors and methods for controlling the formation of injected molded parts.

SUMMARY OF THE INVENTION

The present invention, in a first aspect, is directed to a method for use in forming a molded part. The method includes providing a mold having a cavity and a movable pin, injecting a moldable material into the cavity, biasing the movable pin to maintain an end of the movable pin in contact with the moldable material in the cavity during the curing of the moldable material and until the moldable material is cured, and monitoring movement of the biased movable pin during curing of the moldable material in the mold.

The present invention, in a second aspect, is directed to a sensor for use in forming of a moldable part in a cavity of a mold. The sensor includes a housing connectable to the mold, a movable pin disposed in the housing, the movable pin having an end engageable with a moldable material in the cavity of the mold, an elastic member supported in the housing and engageable with the movable pin for applying a biasing force on the end of the movable pin to maintain the end of the movable pin in contact with the moldable material in the cavity during curing of the moldable material and until the moldable material is cured, and means for monitoring movement of the movable pin when the movable pin is in contact with the moldable material during curing of the moldable material in the cavity.

The present invention, in a third aspect, is directed to a method for controlling the forming of a plurality of molded parts in a cavity of a mold. The method includes monitoring at least one of an in-mold part dimension of a part and in-mold shrinkage of a part based on movement of a movable pin biased to maintain an end of the movable pin in contact with the moldable material in the cavity mold during curing of the moldable material until the moldable material is cured, and controlling a plurality of operating parameters for forming the plurality of molded parts based on the monitored at least one of the in-mold part dimension of the part and the in-mold shrinkage of the part.

The present invention, in a fourth aspect, is directed to a system for controlling the forming of a plurality of molded parts in a cavity of a mold. The system includes a sensor for monitoring at least one of an in-mold part dimension and an in-mold shrinkage of the part based on movement of a movable pin biased to maintain an end of the movable pin in contact with the moldable material in the cavity during curing of the moldable material until the moldable material is cured, and a processor operable to control a plurality of operating parameters for forming the plurality of molded parts based on the monitored at least one of the in-mold part dimension of the part and the in-mold shrinkage of the part.

The present invention, in a fifth aspect, is directed to an article of manufacture which includes at least one computer usable medium having computer readable program code logic to control the forming of a plurality of molded parts in a cavity of a mold. The computer readable program code logic when executing performs obtaining at least one of an in-mold dimension of the part and an in-mold shrinkage of the part based on monitoring a movable pin biased to maintain the end of the movable pin in contact with the moldable material in the cavity during curing of the moldable material until the moldable material is cured, and controlling a plurality of operating parameters for forming the plurality of molded parts based on the monitored at least one of the in-mold dimension of the part and the in-mold shrinkage of the part.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of various embodiments and the accompanying drawings in which:

FIG. 20 is a graph of capacitance verses displacement obtained using the sensor of FIG. 18;

FIG. 21 is a diagrammatic illustration of the cylindrical capacitive elements of the sensor of FIG. 18;

FIGS. 22 and 23 are diagrammatic illustrations of capacitive plate elements;

DETAILED DESCRIPTION OF THE INVENTION

One of the challenges in the injection molding of plastic parts is the control required to produce parts with desired dimensions reproducibly. In-mold shrinkage is the major driver of final part dimensions, and it is a function of cavity pressures, mold and melt temperatures, cycle times, and material properties among other factors. Shrinkage can be very difficult to predict, and particularly, control for tight tolerance in multi-cavity operations.

While prior art sensors prove effective as process control variables, they are in fact poor estimators of the manufactured part quality and advances in machine control have not kept pace with part design requirements. Perhaps surprisingly, the final part dimensions are not precisely known during the product design and mold tooling phases. The control of shrinkage can be difficult, especially in tight tolerance and multi-cavity applications. Molding operations are greatly impaired by the lack of direct observability and controllability of the molded part dimensions since time and cost are expended to equilibrate and measure molded parts. Most molders instead rely on the use of cavity pressure traces or part weight measurements as estimators of the part dimensions. Yet, part dimensions are not exclusively identifiable with cavity pressures or part weight but are also correlated with changes in mold temperature, melt temperature, cycle time, material properties, etc.

Accordingly, there is a continued need for improved process sensors, on-line analysis, and control methods directed to shrinkage prediction and control. The present invention is generally directed to measuring the solidification process (the transition from viscous melt to a solid) as it's occurring within the mold to quantify the degree of shrinkage and translate that volume change to the final part dimensions.

Figure 1:
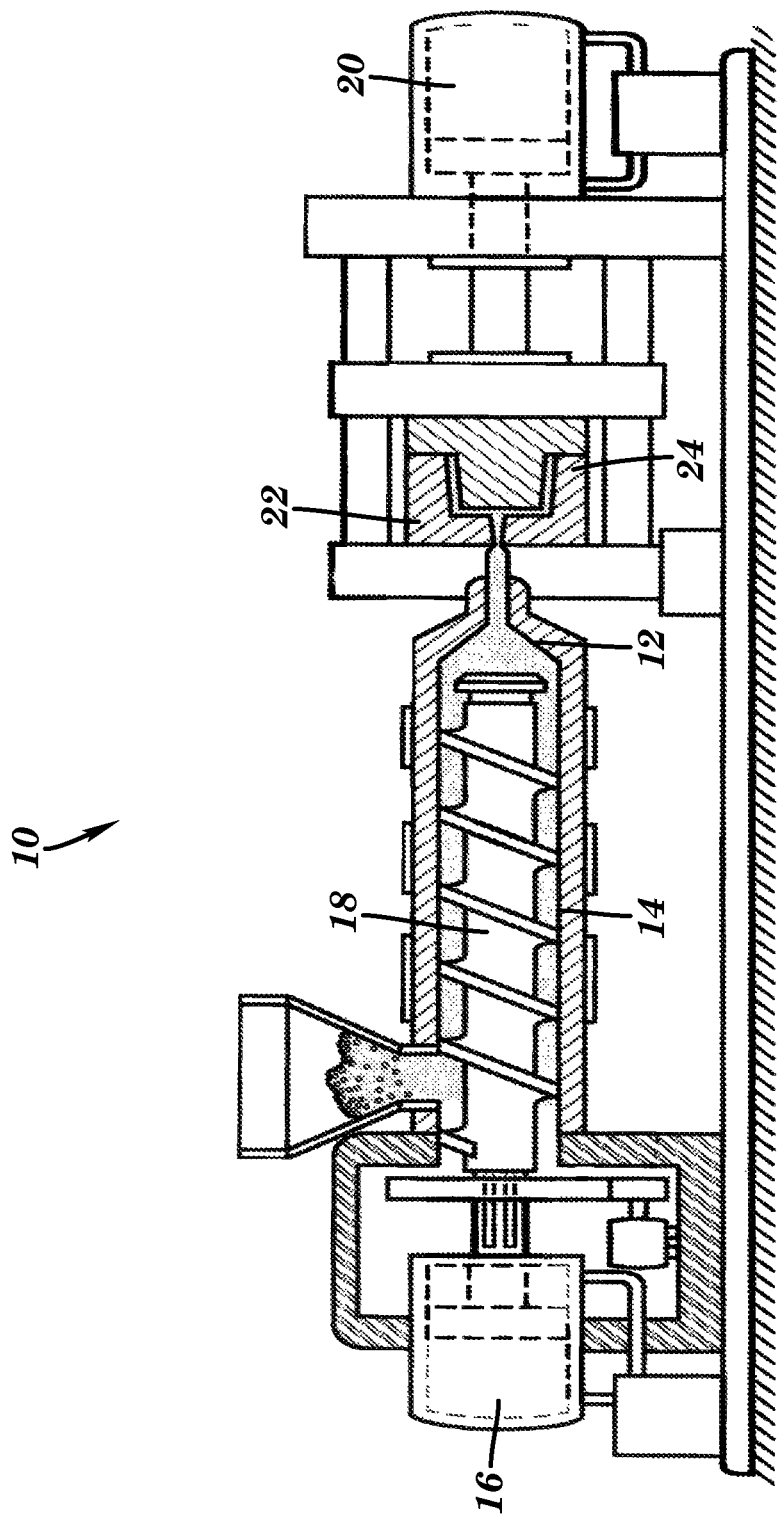
FIG. 1 is a side elevational view, partially broken away, of a prior art injection molding machine.
Figure 2:
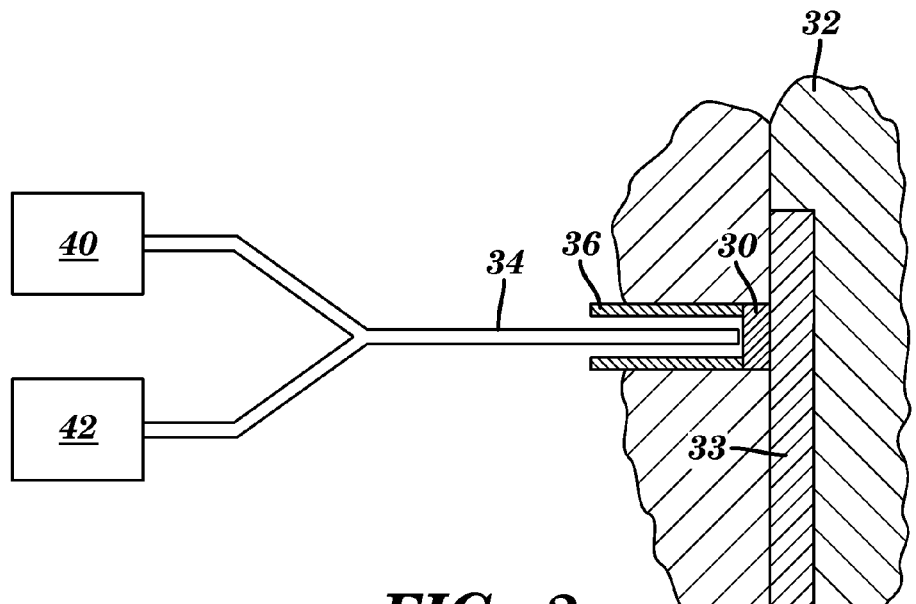
FIG. 2 is a side elevational view of a prior art fiber optical sensor disposed in an ejector pin.
Figure 3:
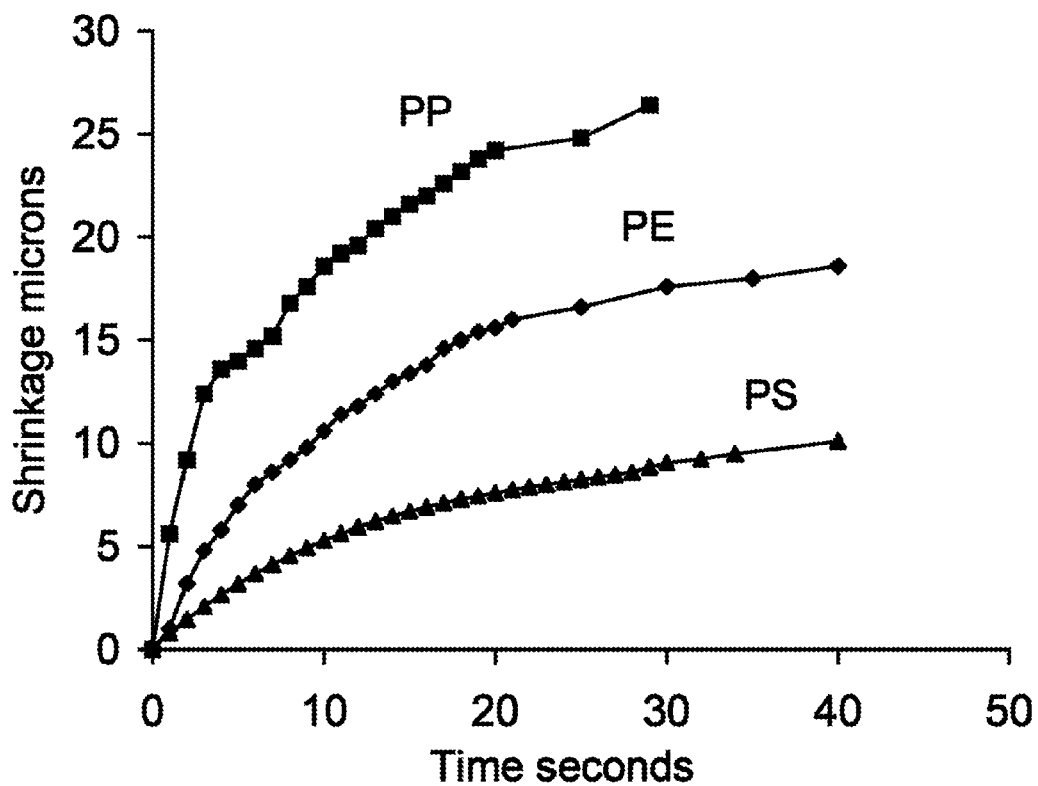
FIG. 3 is a graph of the monitored molded part shrinkage verses time using the fiber optical sensor of FIG. 2.
Figure 4:
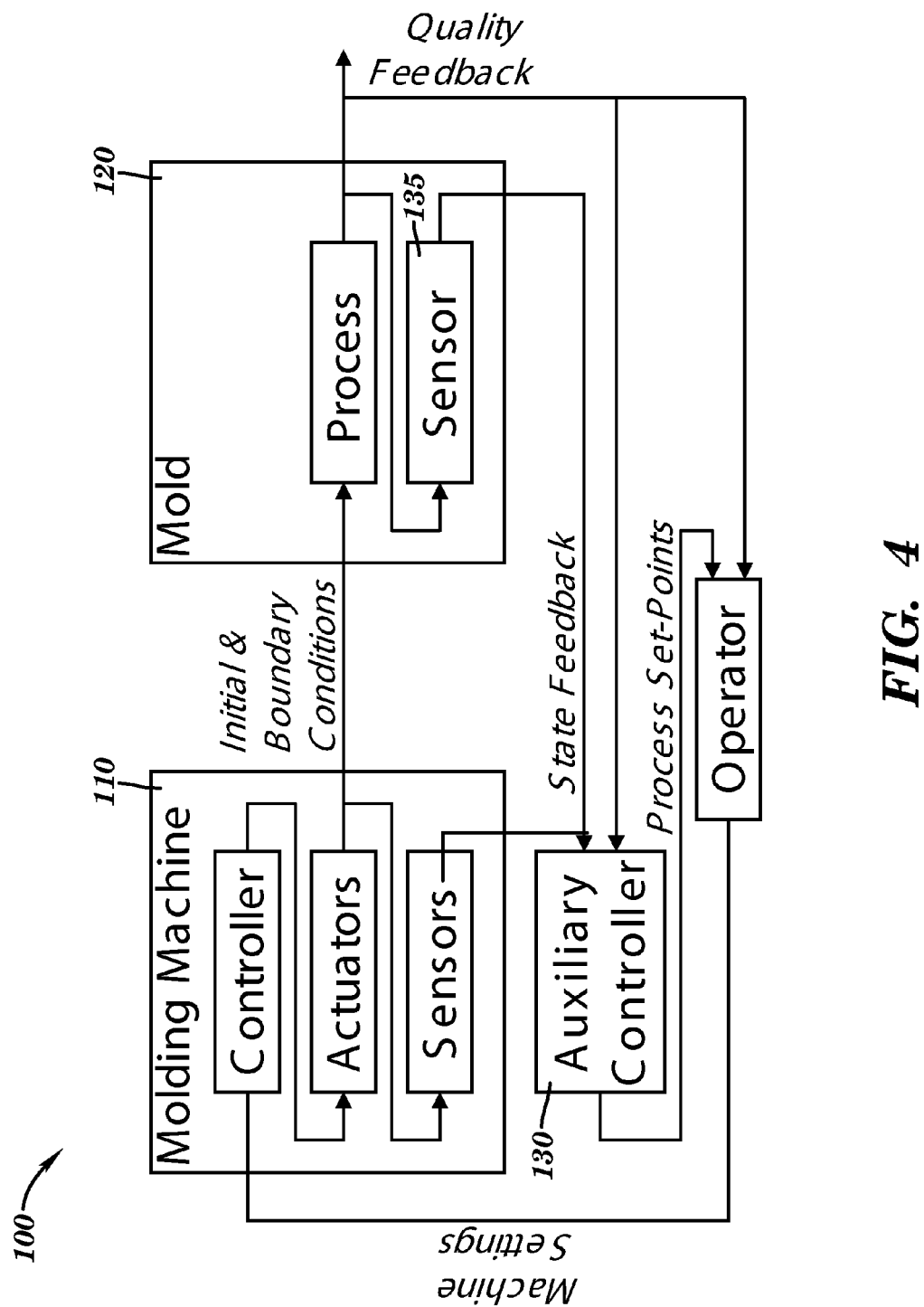
FIG. 4 is a block diagram of a shrinkage sensing system in accordance with the present invention.

FIG. 4 illustrates one embodiment of a shrinkage sensing system 100 in accordance with the present invention. Shrinkage sensing system 100 includes a molding machine 110, a mold 120, and a controller 130. For example, as described in greater detail below, an embodiment a mold sensor 135 in accordance with the present invention may include dual-mode sensors that uses strain gages and piezoelectric elements to measure both in-mold part dimensions, and the forces exerted on the mold wall by the polymer. A shrinkage analysis of the dimensional and pressure data may then be conducted with transient heat analyses to predict the final molded part dimensions after cooling and annealing. The dual in-mold shrinkage and pressure sensors enable a cost, size, and usage similar to that of commercially available sensors while also advancing model-based controller development. The sensor and theory may facilitate higher quality and lower cost manufactured products. The present invention may be advantageous given the described sensor development together with the modeling, instrumentation, and experimentation. Desirably, the present invention is directed to measurement of molded products' dimensions in situ prior to ejection from the mold. The controller may be a suitable processor or microprocessor or microcontroller having suitable memory and input and output devices. In addition, a suitable computer may be employed to implement the techniques of the present invention.

For example, the present invention in one embodiment provides a high fidelity system for controlling molded part dimensions by integrating, for example, three sub-systems including:

1. a dual-mode sensor utilizing strain gages and piezoelectric elements to monitor both the in-mold part dimensions and melt pressure;
2. a shrinkage analysis to use the sensed dimensional and pressure data with transient analyses to predict the final molded part dimensions after cooling and annealing; and
3. an auxiliary controller to track the consistency of the molding process, perform control actions given the part quality requirements, and recommend alternative process set-points.

The present invention also provides a method for molders to achieve, track, and optimize molded part dimensions relative to tight tolerances. For example, the present invention includes:

1. The creation and installation of the in-mold shrinkage and pressure sensor.
2. The implementation of an auxiliary shrinkage controller which uses the output of the shrinkage sensor with some preliminary shrinkage models to predict the final part shrinkage and recommend potential process settings to satisfy quality specifications.
3. The development and validation of more sophisticated shrinkage analyses for unfilled amorphous and semi-crystalline resins; the fidelity of this modeling activity is increased by the measured in-mold shrinkage and cavity pressure.
4. The implementation of the developed system in industrial applications.

Shrinkage Instrumentation

Figure 5:
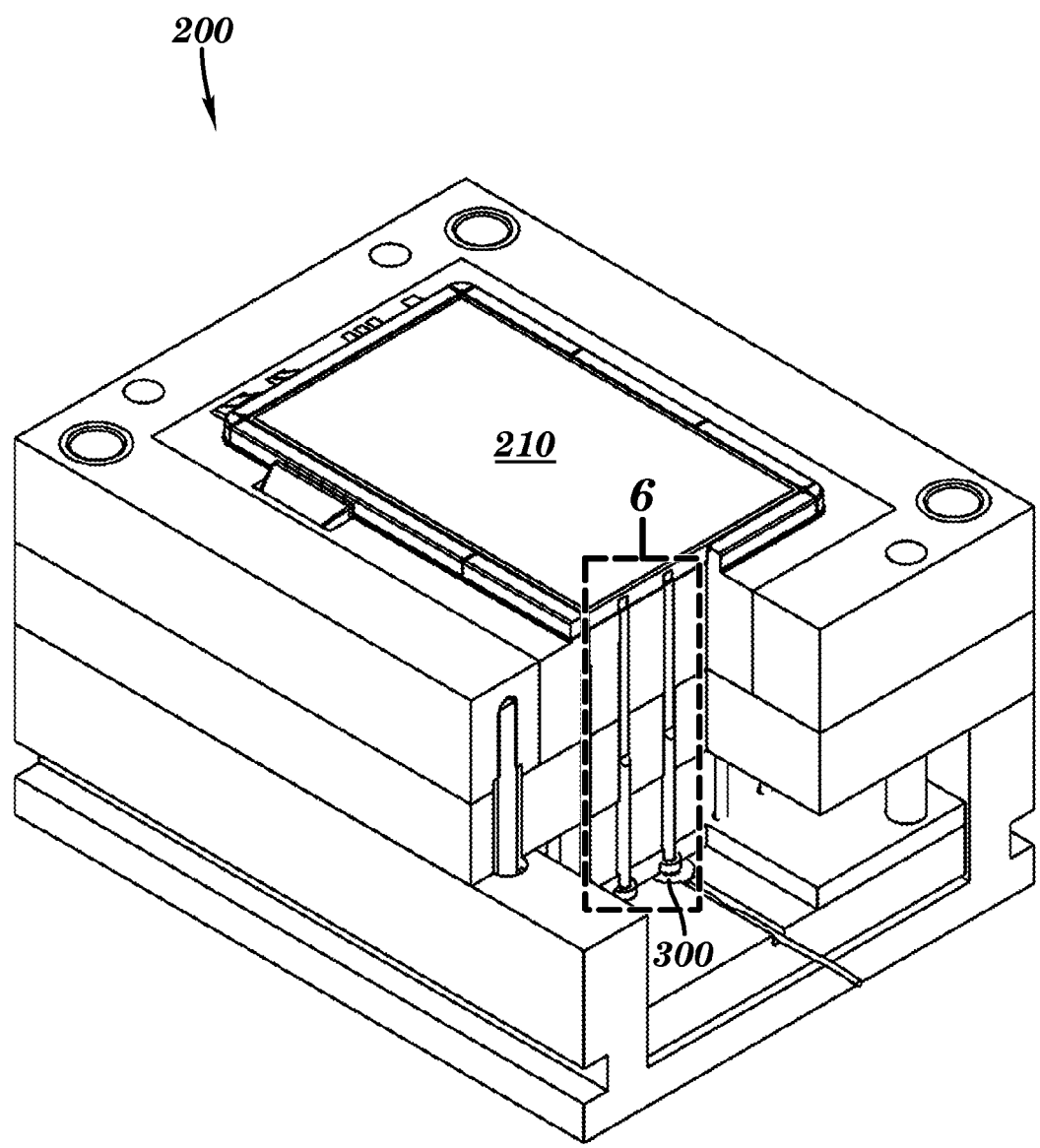
FIG. 5 is a perspective view, partially cut-away, of a mold having dual-mode shrinkage and pressure sensor in accordance with the present invention.
Figure 6:
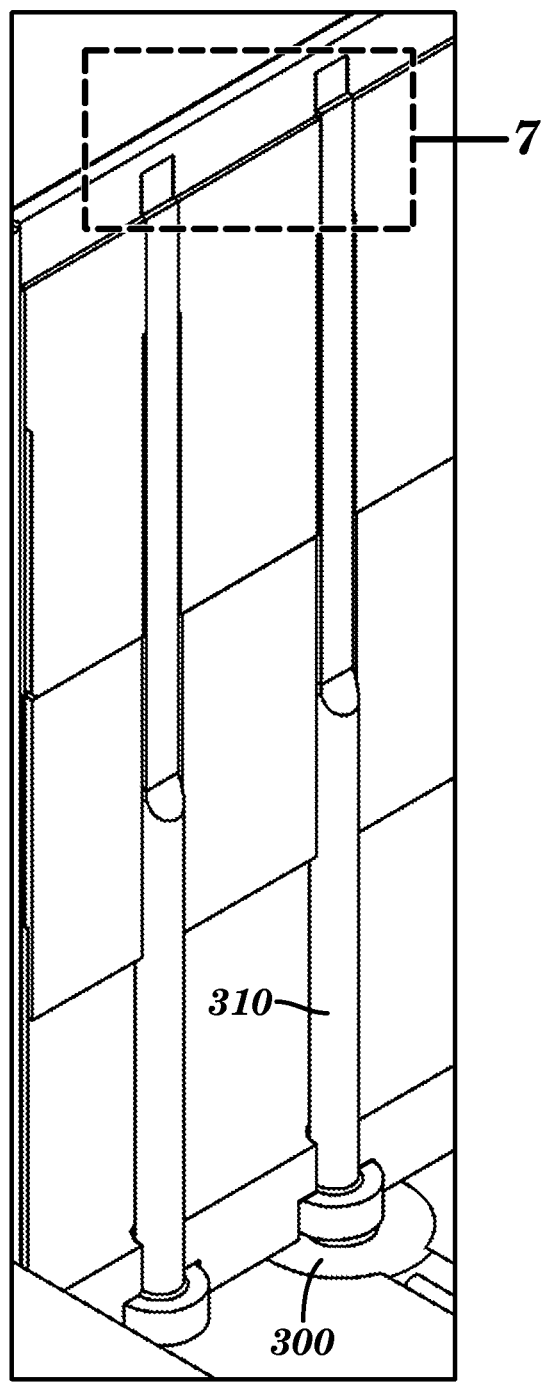
FIG. 6 is an enlarged perspective view of the movable pin of FIG. 5.
Figure 7:
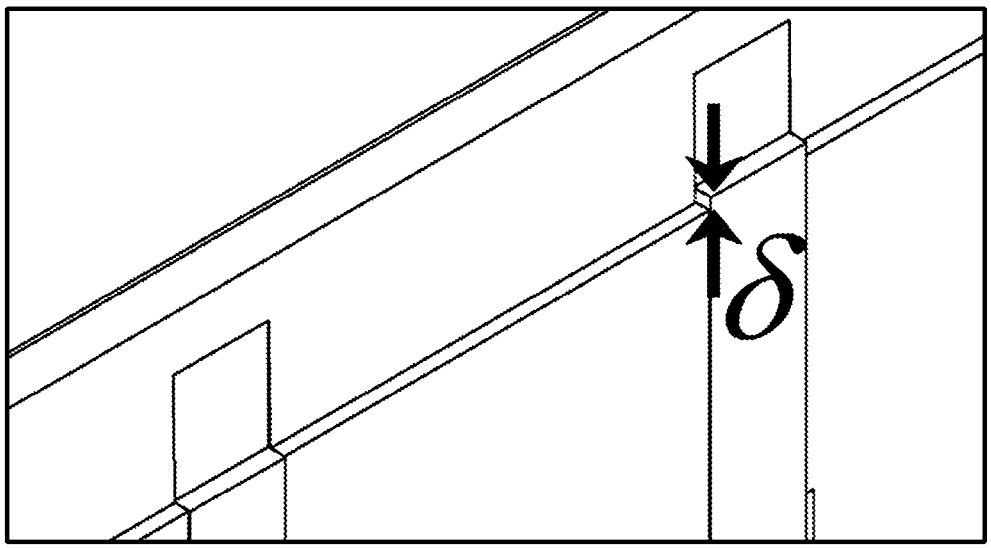
FIG. 7 is an enlarged perspective view of the upper end of the movable pin of FIG. 6 which extends into the mold cavity.
Figure 8:
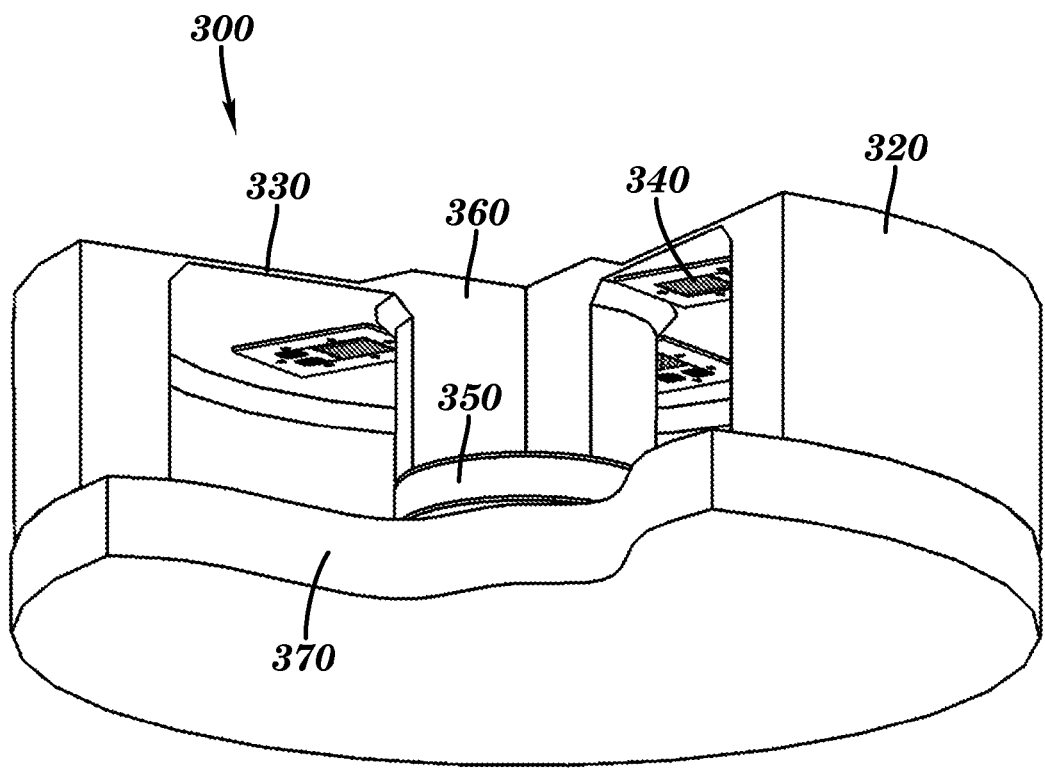
FIG. 8 is an enlarged perspective view of the dual-mode shrinkage and pressure sensor of FIG. 5.

FIG. 5 illustrates one embodiment of a mold 200 having a cavity 210 for forming a part which incorporates a dual-mold sensor 300 in accordance with the present invention for measuring in-mold shrinkage and cavity pressure. Sensor 300 is disposed in the mold to engage a movable pin 310. With reference to FIGS. 5-8, sensor 300 is placed beneath movable pin 310 such as an ejector blade or ejector pin, and causes the movable pin to protrude slightly when the mold is opened as shown in FIG. 7. As best shown in FIG. 8, sensor 300 may include a housing 320, which is connectable to the mold, e.g. received in a recess portion of the mold below the movable pin. An elastic member 330 is supported by the housing and engageable with an end of the movable pin for applying a biasing force on the end of the movable pin. For example, the elastic member may comprise at least one diaphragm for applying the biasing force. A displacement transducer 340 is operably connected to the elastic member for use in monitoring the position of the movable pin and the part dimension.

For example, the displacement transducer may be one or more strain gage operably connected to the elastic member for use in measuring the position of the movable pin. At least one piezoelectric cell 350 for monitoring a biasing force exerted on the movable pin may be disposed between a stop 360 attached to the elastic member, and an end cap 370.

In this embodiment, sensor 300 may be derived from button-type load cells in which an instrumented diaphragm provides a reaction force to the movable pin in contact with the surface of the part being molded. While the exact capabilities will vary with the detailed design of the system, the sensor may have a range of travel of 0.5 mm, which corresponds to a 0.5 microns (μm) resolution given only 10 bits of precision in the data acquisition system. The bending of the diaphragm under an imposed load causes the resistance of the associated strain gages to increase with increasing elongation while narrowing the strain elements. These changes in the strain gage geometry cause an increasing resistance with strain. The magnitude of the imposed load can be closely estimated by measuring the voltage across the strain gage(s) and subsequent scaling related to the gage factor and diaphragm stiffness. The design of the sensor may be based, for example, actuation forces, optimization with respect to sensitivity, linearity, and longevity, and subsequently validating the sensor's function in a variety of molding applications.

With reference to again to FIG. 5, after the mold 200 is closed, the melt pressure exerted on the top surface of the movable pin will cause the sensor to be fully actuated and impose stress on sensor 300, and in particular, the strain gages and the piezoelectric cell. As the melt in the mold cavity cools and shrinks, the melt pressure will decay and the molded part will draw away from the cavity walls. The reaction force provided by the sensor diaphragm will cause the movable pin 310 to maintain contact with the face of the molded part and a measurable relaxation of the imposed stress in the diaphragm. While an ejector blade may have a square cross-section and an ejector pin may have a round cross-section, it will be appreciated by those skilled in the art that the blades and pins may have other suitable cross-sections.

The structural design of sensor 300 may be initially guided by plate bending theory which states that the maximum stress, σ, and deflection, δ, of the diaphragm are:

$$\sigma = k_1 \frac{P_{melt} \phi_{pin}^2}{h_{diaphragm}^2} \quad (1)$$

$$\delta = k_2 \frac{P_{melt} \phi_{pin}^2 \phi_{diaphragm}^2}{E h_{diaphragm}^3} \quad (2)$$

where $P_{melt}$ is the melt pressure, $\phi_{pin}$ is the movable pin diameter, $\phi_{diaphragm}$ is the diaphragm diameter, $h_{diaphragm}$ is the diaphragm thickness, E is the elastic modulus, and the coefficients $k_1$ and $k_2$ are related to the aspect ratio and constraints of the diaphragm. Similar analyses apply for different sensor geometries as well as non-round ejectors, such as the ejector blade.

The selection of the strain gages and piezoelectric cell is also guided from established theory. The voltage output, $V_\delta$, from a Wheatstone bridge of four strain gages is a function of the movable pin deflection:

$$V_\delta = k_3 \delta S_g V_e \quad (3)$$

where $S_g$ is the gage factor, $V_e$ is the excitation voltage, and $k_3$ is a coefficient relating the diaphragm deflection to the imposed strain in the strain gages. When the piezoelectric cell contacts the end cap, the voltage output, $V_\sigma$, from the piezoelectric cell is a function of the imposed stress:

$$V_\sigma = k_4 h_{cell} \sigma_{cell} \quad (4)$$

where $h_{cell}$ is the thickness of the piezoelectric cell, $\sigma_{cell}$ a is the imposed stress in the piezoelectric cell, and $k_4$ is a coefficient related to the system capacitance and piezoelectric cell's permittivity.

Figure 9:
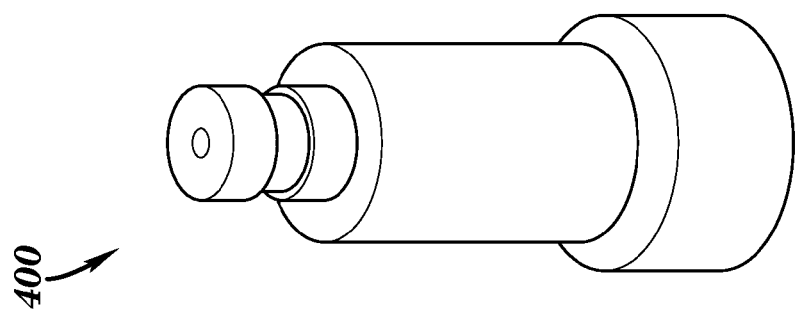
FIG. 9 is a perspective view of a direct mount sensor in accordance with the present invention.

FIG. 9 illustrates an embodiment of a direct mount sensor 400 in accordance with the present invention. Sensor 400 may be directly mounted and extend into the mold cavity. In this illustrated embodiment, the direct mount design uses two structural members of varying compliance to control the contact force and deflection for shrinkage measurement.

Figure 10:
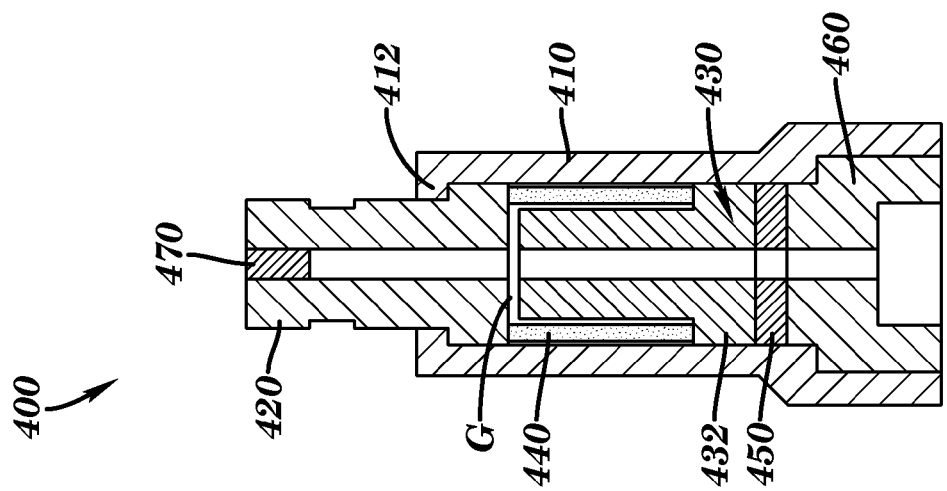
FIG. 10 is an enlarged cross-sectional view of the direct mount sensor of FIG. 9.

For example, as best shown in FIG. 10, sensor 400 may include a generally hollow cylindrical housing 410 having a shoulder 412, a movable pin such as a sensor head 420 which is disposed in and extends from housing 410, a steel rod 430 having a step 432 disposed within and below sensor head 420, an elastic member 440 such as a hollow aluminum sleeve sandwiched between a lower end of sensor head 420 and step 432 of steel rod 430. The elastic or compliant member 440 is sized to provide a gap G between the lower end of the sensor head and the top of the steel rod. A piezoelectric cell 450 is disposed between a lower end of steel rod 430 and a plug 460 which attaches to housing 410. A thermocouple 470 may be disposed at the upper end of sensor head 420. The sensor head, the steel rod, the piezoelectric cell, and the plug may have respective passageways therethrough to define a channel through which a wire may be connected to the thermocouple.

Figure 11:
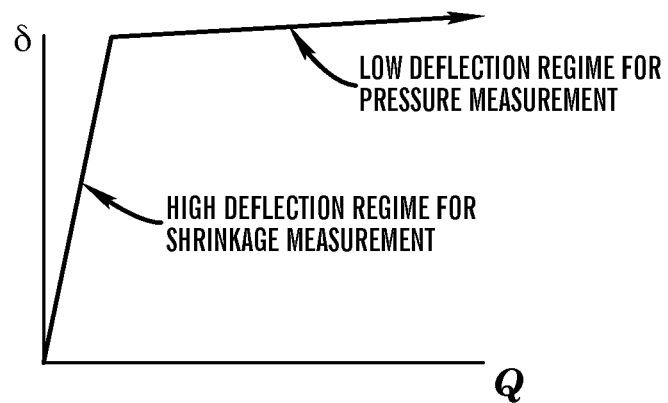
FIG. 11 is a graph of deflection verses charge using the direct mount sensor of FIG. 9.
Figure 12:
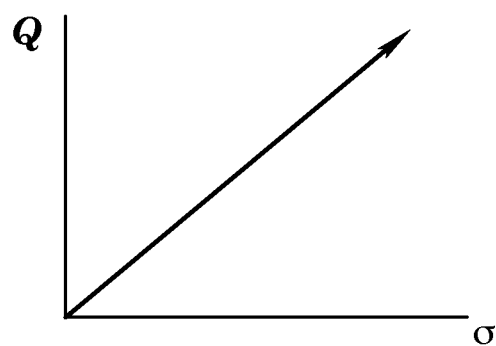
FIG. 12 is a graph of charge verses stress using the direct mount sensor of FIG. 9.

In operation, the mold material pushes on sensor head 420. The aluminum sleeve provides a compliant deflection. The steel rod on contact with the sensor head provides greater stiffness as shown in FIG. 11. The piezoelectric cell outputs a charge, Q, with stress, σ, as shown in FIG. 12. Deflection, d, is back calculated from the joint rod and sleeve compliance.

For example, a single piezoelectric element may be used if the system behavior is well known and the signal conditioning is of sufficient quality for determining deflection. Alternatively, the elastic member or compliant sleeve, e.g., the aluminum sleeve, may be instrumented with one or more strain gages for direct deflection measurements. Compared to the design of FIG. 5, the sensor design of FIGS. 9 and 10 may be more accurate but may result in a higher cost. The higher cost may be justified through the addition of a thermocouple at the sensor head that acts as the movable pin, providing direct pressure-volume-temperature measurement in a single pressure-volume-temperature (PvT) sensor.

Figure 13:
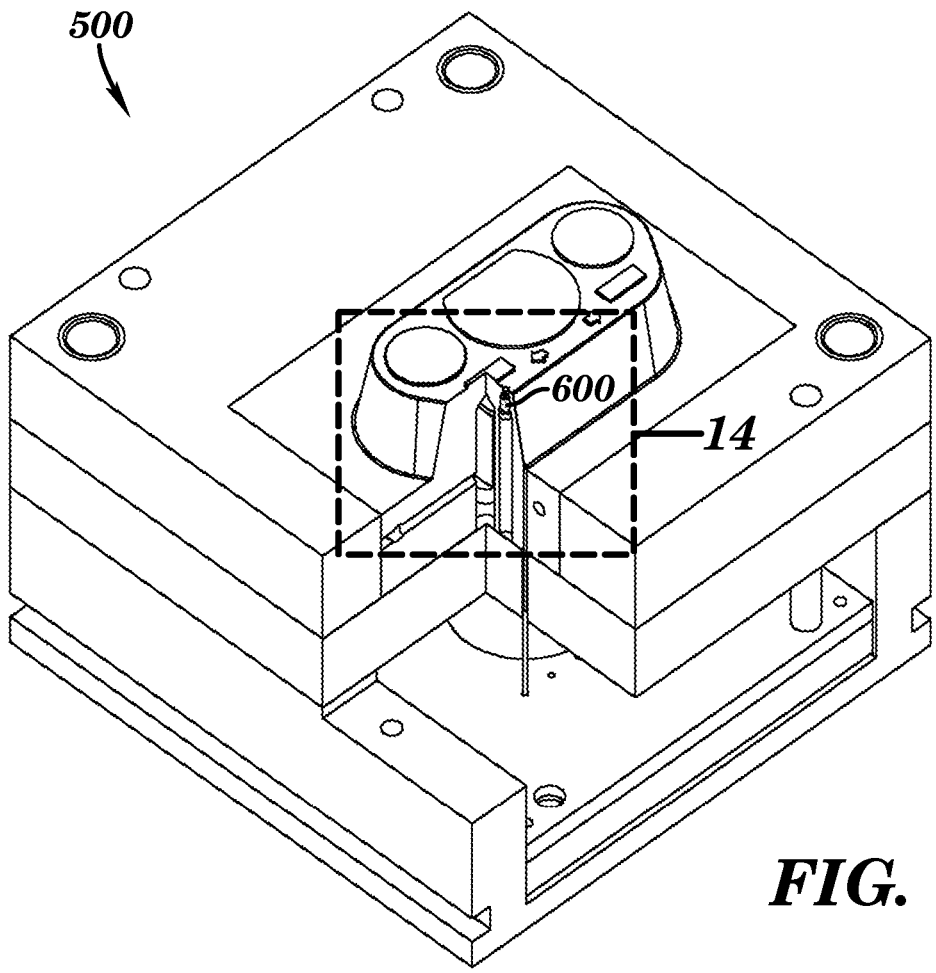
FIG. 13 is a perspective view, partially cut-away, of a mold having a dual-mode shrinkage and pressure sensor in accordance with the present invention.
Figure 14:
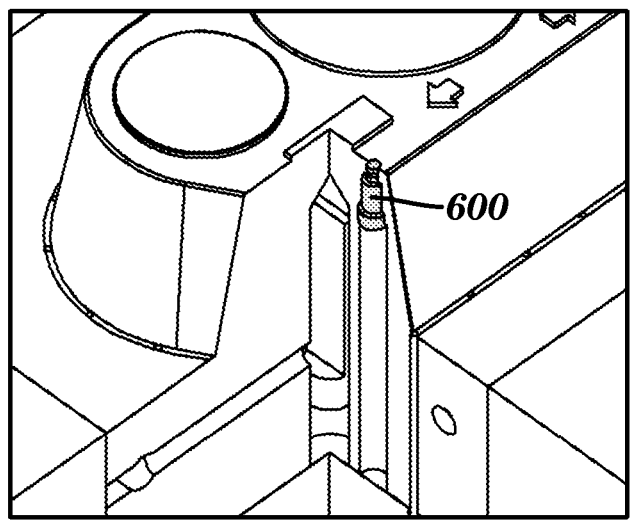
FIG. 14 is an enlarged perspective view of the mold and the sensor of FIG. 13.
Figure 16:
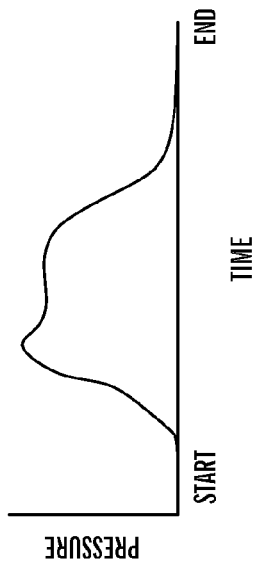
FIG. 16 is a graph of pressure verses time obtained using the sensor of FIG. 15.
Figure 17:
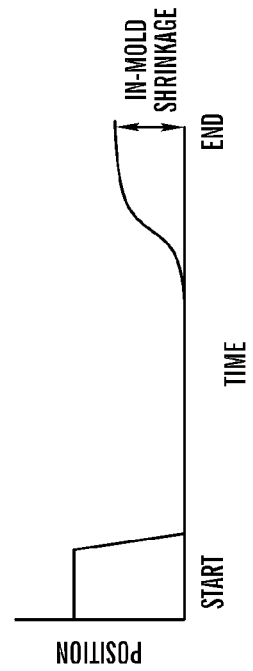
FIG. 17 is a graph of position verses time obtained using the sensor of FIG. 15.

FIGS. 13 and 14 illustrate another embodiment of a mold 500 having a cavity for forming a part which incorporates a dual shrinkage and pressure sensor 600 in accordance with the present invention for measuring in-mold shrinkage and cavity pressure for production of automotive instrument panels. The sensor is installed as for a conventional pressure transducer but with the sensor head protruding slightly above the cavity surface. In operation, the melt pressure causes the sensor to retract until flush with the surface of the mold. As the polymer melt cools and shrinks, the cavity pressure decays to zero, as shown in FIG. 16, and the solidifying plastic will pull away from the cavity wall. A small biasing force within the sensor causes the sensor head to maintain contact with the molded part, such that the sensor continues to track the part shrinkage during the molding process. The sensor in this example measures the shrinkage in the thickness direction, as shown in FIG. 17, which is typically greater than the shrinkage in the transverse directions due to variations in material constraints. As such, the shrinkage in the thickness direction is almost universally desired in manufacturing applications. Furthermore, the proposed sensor design can be placed at the bottom of ribs or the edge of the cavity to directly measure changes in length.

Figure 15:
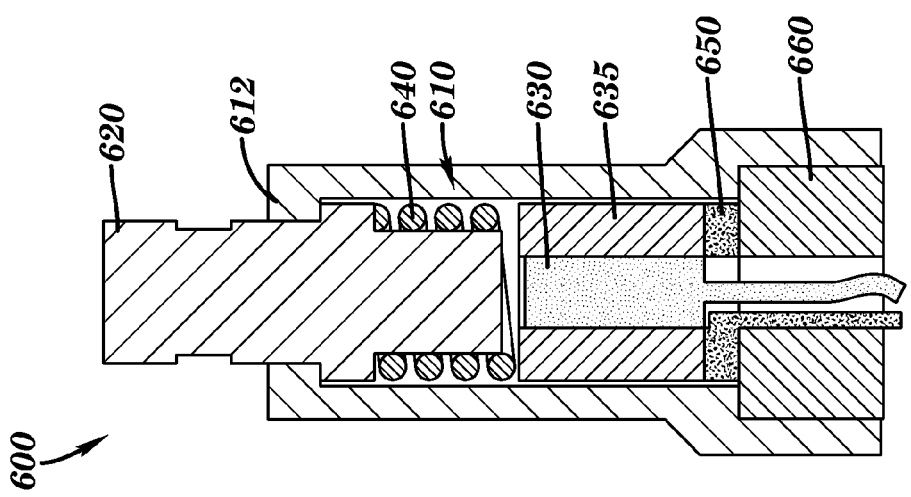
FIG. 15 is an enlarged cross-sectional view of the sensor of FIG. 13.

As best shown in FIG. 15, sensor 600 employs different sensing elements for the applied pressure and sensor head position. For example, sensor 600 may include a hollow cylindrical housing 610 having a shoulder 612, a movable pin such as a sensor head 620 which is disposed in and extends from housing 610, a position transducer 630 disposed within and below sensor head 620, a position transducer support 635 disposed around position transducer 630, a spring 640 sandwiched between a lower end of sensor head 620 and position transducer support 635. A piezoelectric cell 650 is disposed between a lower end of position transducer support 635 and a plug 660 which attaches to the lower end of housing 610.

For example, the position transducer may be a differential variable reluctance displacement transducer (DVRT) used to measure the displacement of the sensor head. The DVRT is a non-contact transducer that contains sensing and compensation windings. When the rear surface of the sensor head is brought in close proximity to the DVRT transducer, the reluctance of the sensing coil is changed while the compensation coil acts as a reference. The two coils are excited with a high frequency voltage such that their difference provides a sensitive measure of the position signal independent of the ambient temperature. While the output must be linearized with respect to the sensor head displacement, the DVRT is otherwise ideal due its small size, wide operating temperature range, excellent precision (0.1% of 0.5 mm full scale range), high signal to noise ratio, and long term robustness.

The DVRT is supported and recessed within a threaded metal sleeve, which also supports the biasing spring. The sensor head will retract due to the force exerted by the melt pressure on its front surface. The biasing force is selected to be small relative to typical melt pressures in polymer processing, such that the rear surface of the sensor head will contact the DVRT support, which thereby transfers the load to the piezoelectric (PZT) disk(s). The voltage output, V, from the PZT cell is a function of the imposed stress:

$$V = kh_{cell}\sigma_{cell} \qquad (5)$$

where $h_{cell}$ is the thickness of the piezoelectric cell, $\sigma_{cell}$ is the imposed stress in the piezoelectric cell, and k is a coefficient related to the system capacitance and piezoelectric cell's permittivity.

The sensor design may be optimized using mold filling simulations to ensure suitability in a variety of molding applications with different cavity polymeric materials, cavity wall thicknesses, and operating conditions. A set of sensors may be manufactured according to a design of experiments about this design to investigate the effect of design parameters such as sensor head diameter, spring bias force, clearances, and other parameters. The set of sensors may then be used as an inner array in a larger design of experiments that uses an outer array designed to investigate polymer properties, cavity wall thicknesses, and operating conditions.

Figure 19:
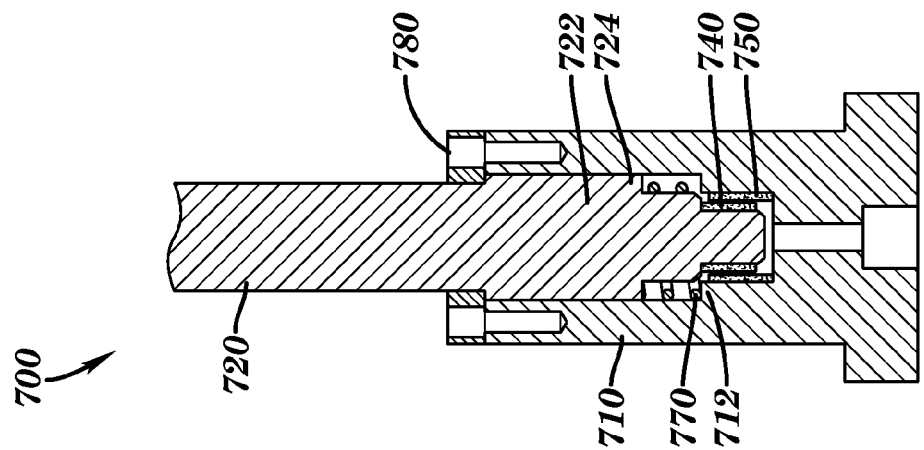
FIG. 19 is an enlarged cross-sectional view of the sensor of FIG. 18.
Figure 18:
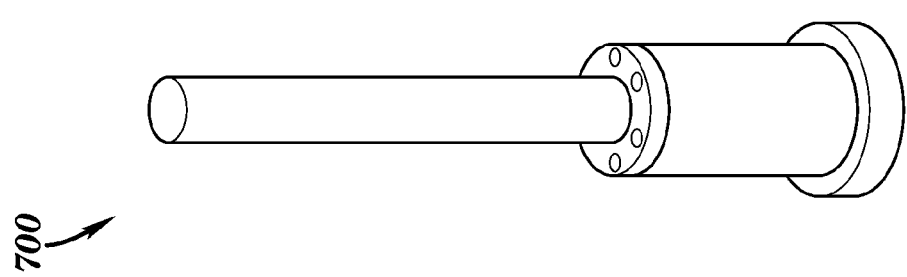
FIG. 18 is a perspective view of a capacitive shrinkage sensor in accordance with the present invention.

FIG. 18 illustrates an embodiment of a capacitance type shrinkage sensor 700 in accordance with the present invention. With reference to FIG. 19, sensor 700 includes a generally hollow cylindrical housing 710, and a pin 720. A lower end 722 of pin 720 is receivable and retained within housing 710. A helical coil spring 770 is disposed around a portion of the lower end of pin 720. The ends of the spring are sandwiched between a stop or shoulder 724 in pin 720 and a stop or shoulder 712 on housing 710. Displacement transducer elements such as an inner displacement transducer element 740 is disposed on pin 720 and an outer displacement transducer element 750 is disposed on housing 710. A cover 780 prevents ejection of pin 720 from the housing 710 by coil spring 770. The coil spring biases the pin against the molded part to provide a measurement as the molded part shrinks away from the walls of the mold cavity. While this design does not measure cavity pressure, the design is compact and provides for a variety of movable pins with respect to different shapes and sizes.

In this embodiment, two co-axial cylindrical capacitance elements are used as transducer elements. The capacitance elements are instrumented on the movable pin and pin base as shown FIG. 19. The pin travels under melt pressure as the plastics shrinkage changes, resulting in a capacitance change and resulting output signal as shown in FIG. 20. The sliding co-axial cylindrical capacitance elements as shown in FIG. 21 can be considered, for example, as two parallel plates sliding over each other as shown in FIG. 22, where the pin displacement may be sensed by varying the surface area of the electrodes of a flat plate capacitor. Also, the sensor output is linear correspondence to the pin displacement which enables the direct measurement of the in-mold shrinkage as shown in FIG. 20. The melt temperature within the cavity can be measured if thermocouple is used as a movable pin or within a movable pin. A shrinkage calculation may be defined as:

$$C = \frac{\varepsilon_0 \varepsilon_r (A - wx)}{d}$$

where $\varepsilon_r$ is the relative permittivity of the material between the plates, $\varepsilon_0$ is the permittivity of vacuum, A is the plate area, d is the plate separation or gap and x is the displacement of the plate.

With a plate size of 100 mm×100 mm and a spacing of 1 mm, the capacitance in vacuum, neglecting a small fringe effect, is 88.54 pF. With a vacuum dielectric, the relative dielectric constant $\varepsilon_r$ is 1. An air dielectric increases K to 1.0006. Typical dielectric materials such as plastic or oil have dielectric constants of 3-10, and some polar fluids such as water have dielectric constants of 50 or more.

The design of the sensor may be optimized using the in-mold simulation to ensure suitability in a variety of molding applications with different polymeric materials, cavity wall thicknesses, and operating conditions. A set of sensors may be manufactured using a design of experiments to investigate the effect of design parameters such as diaphragm thickness, diaphragm diameter, and other dimensions. This set of sensors may be used as an inner array in a larger design of experiments that uses an outer array designed to investigate polymer properties, cavity wall thicknesses, and operating conditions. The results of this internal validation may be used to subsequently improve the sensor design and shrinkage analyses.

Shrinkage Analysis

Several prior art models for predicting shrinkage have been developed. The one exemplary model considers the shrinkage, s, as:

$$s = \alpha(T_{eject} - T_{final}) \qquad (6)$$

where α is the polymeric material's coefficient of thermal expansion, $T_{eject}$ is the temperature of the molded part upon ejection from the mold, and $T_{final}$ is the temperature of the molding during end use. This model will typically over predict the shrinkage since it does not consider the tensile stresses that develop in the molded part as the polymeric material cools from the solidification temperature to the ejection temperature. Furthermore, this model does not consider the expansive state of the melt caused by the melt pressure, which will tend to prevent the polymer from exhibiting any shrinkage until this pressure is relieved. This more complex shrinkage behavior is well characterized by the pressure-volume-temperature relation shown in FIG. 9.

Figure 24:
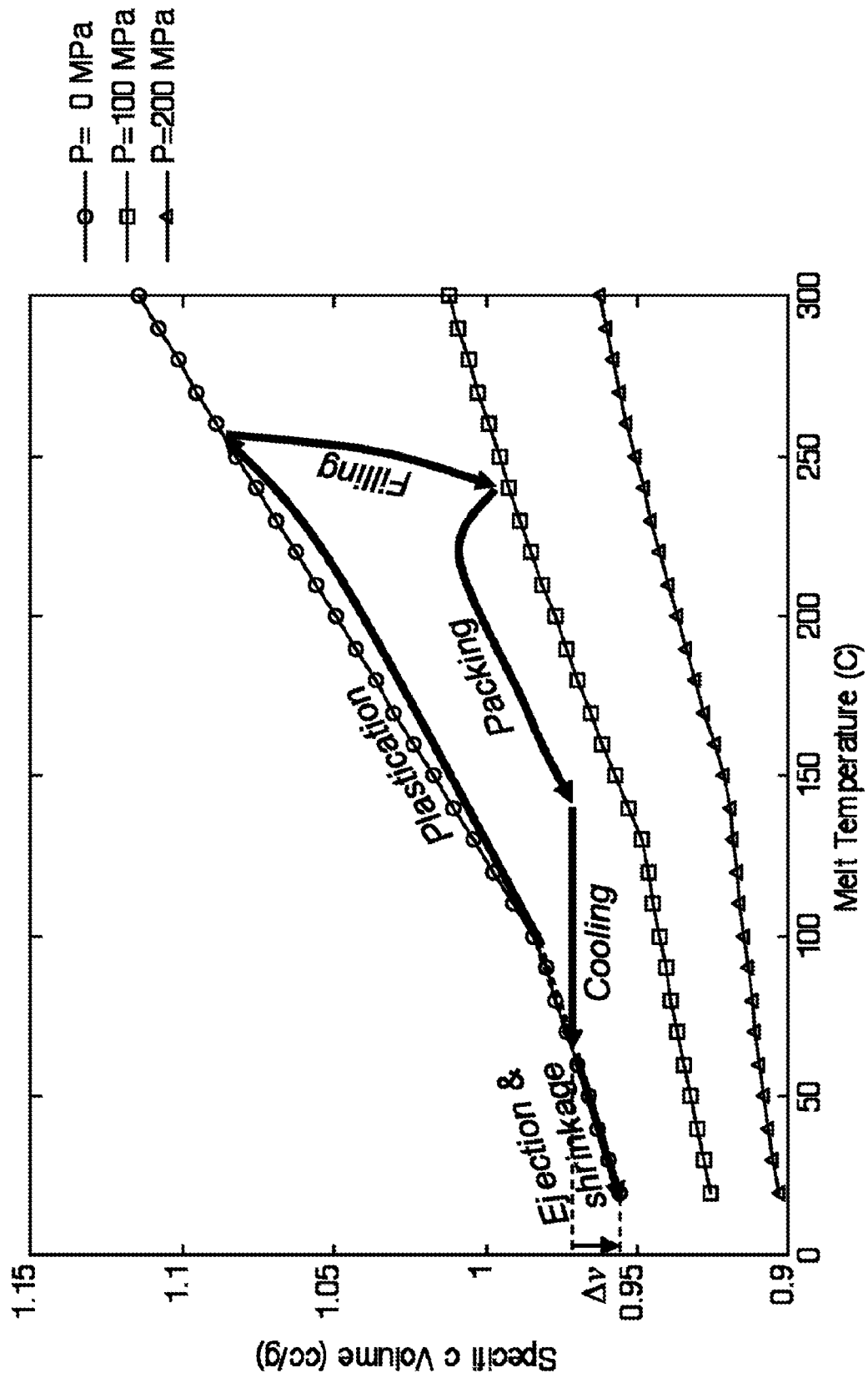
FIGS. 24-26 are graphs of shrinkage analysis based on pressure-volume-temperature behavior.
Figure 25:
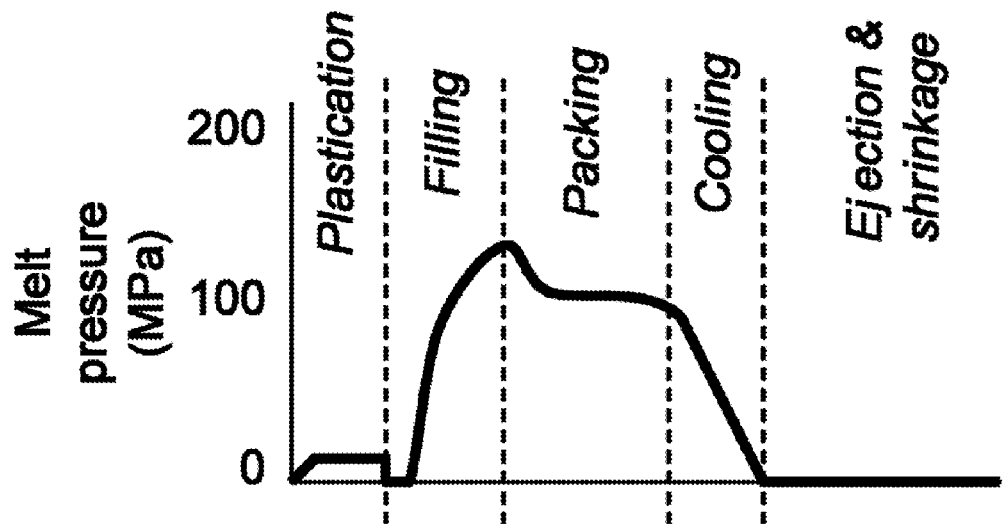
Figure 26:
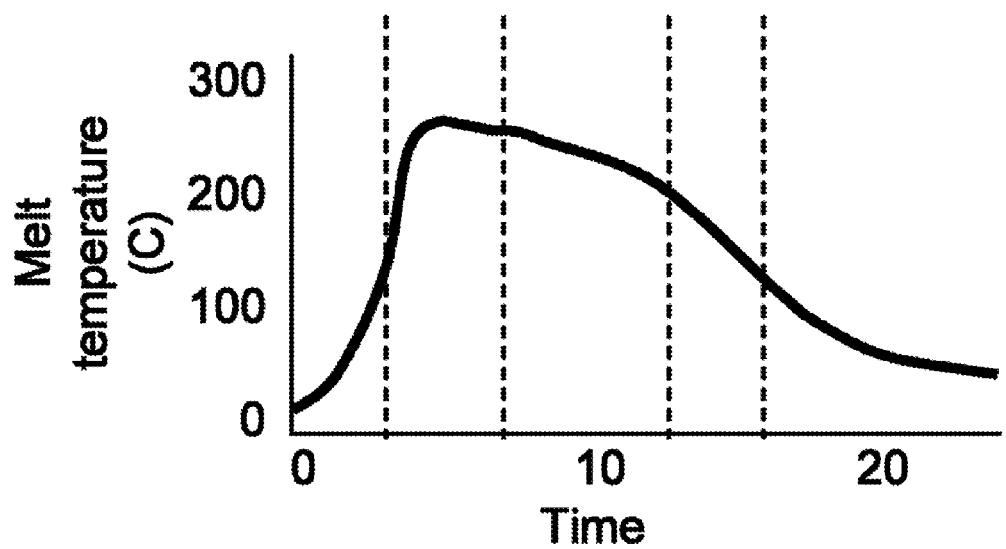
Figure 27:
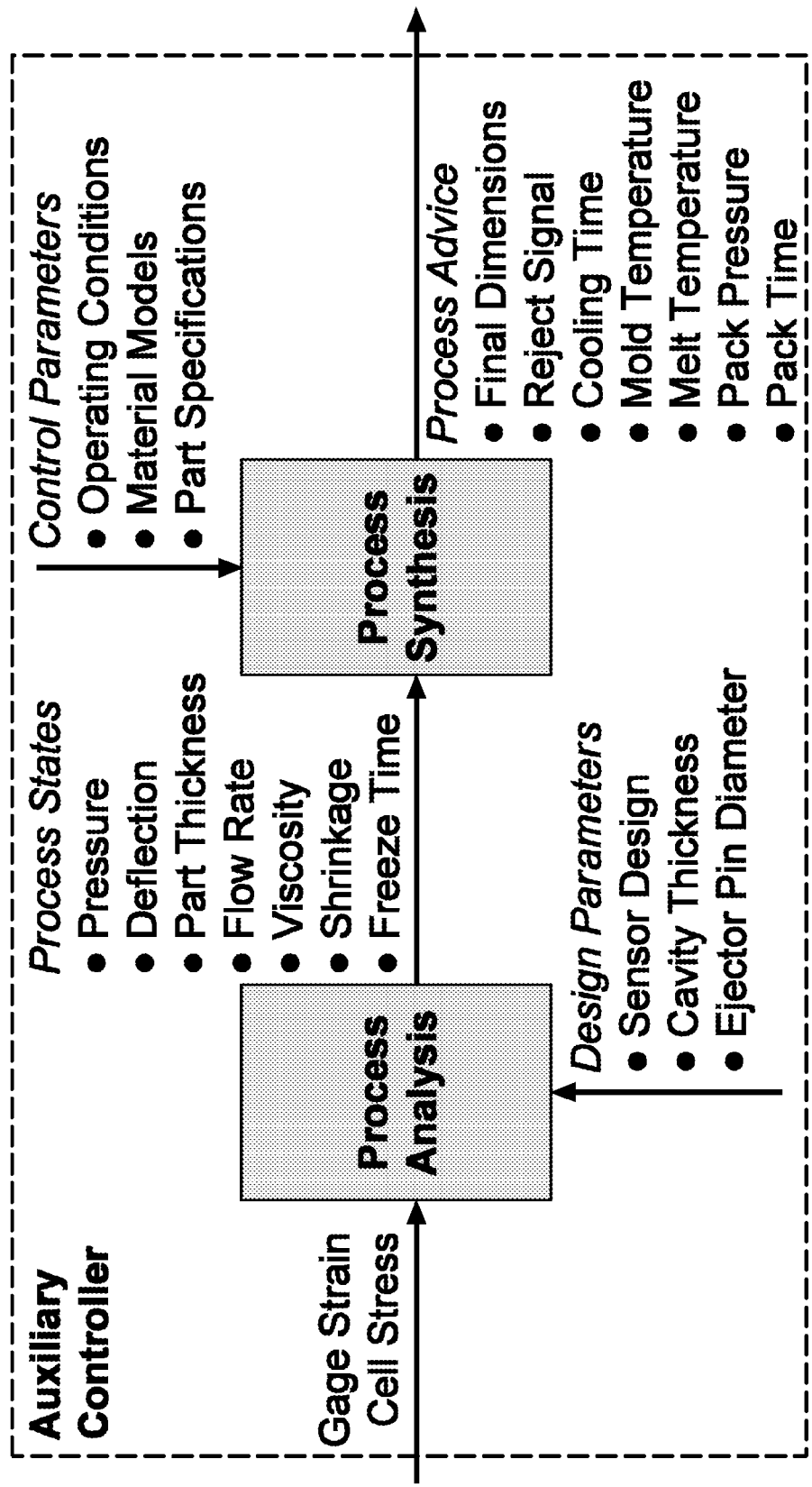
FIG. 27 is a block diagram of one embodiment of a controller design in accordance with the present invention.

Other prior art models for predicting shrinkage are slightly more complex based on pressure-volume-temperature (PvT) data of characterized materials. As shown in FIG. 24, PvT data is typically plotted for various isobars as a function of melt temperature. Given this constitutive model for the specific volume, the material's volumetric shrinkage can be calculated between any two pressure-temperature states. While the specific volume of the molded part, $v_{final}$, at the end-use conditions are usually known, the specific volume of the melt, $v_g$, at solidification requires the tracking or estimation of the material's melt pressure and temperature as shown in FIGS. 25 and 26. If the pressure and temperature history are known, then an improved estimate of the shrinkage can be provided as:

$$s \approx \frac{1}{3} \frac{v_g - v_{final}}{v_g} \quad (7)$$

Both of the above models may be deployed in the present invention. However, both of these models may be insufficient given that they do not explicitly consider the development of residual stress due to the compression of the melt by the injection pressure, decay of the compressive stress with adiabatic cooling or molecular relaxation, and evolution of tensile stresses with continued cooling and volumetric shrinkage.

The present invention may extend the existing shrinkage models in two significant ways. First, the shrinkage analysis may be use to the measured shrinkage and cavity pressure measurements as initial and boundary conditions during the packing and cooling stages of the molding process. By comparison, the previous shrinkage models did not have access to in-mold shrinkage data and so propagated faulty initial conditions throughout the shrinkage analysis. Second, with the previous work regarding the shift factor at low temperatures, which will be used to more accurately model the short-term properties and, when coupled with other material modeling data (e.g., time-aging time superposition), may capably predict the part dimensions after cooling and annealing.

Shrinkage Control

Figure 29:
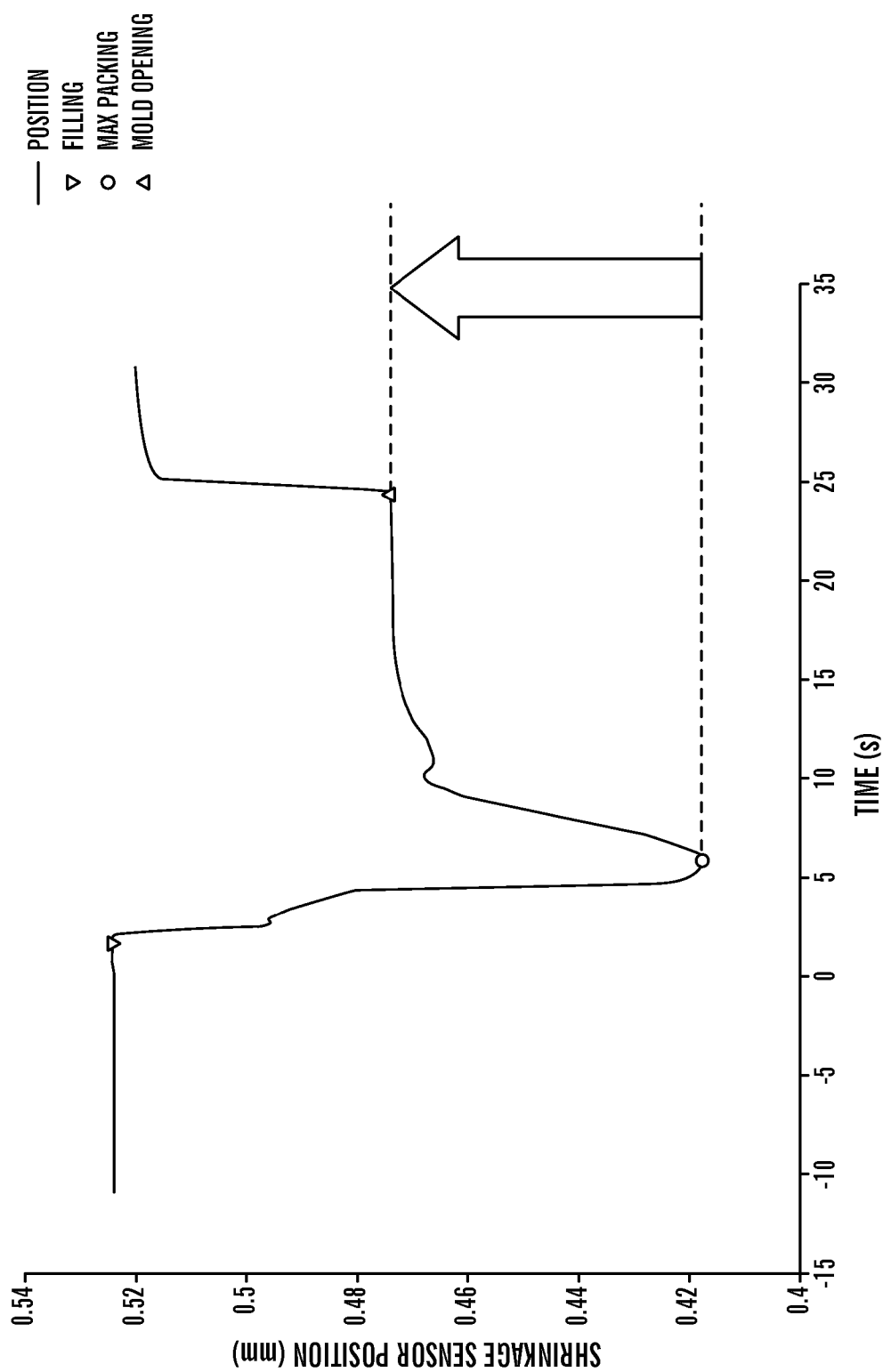
FIG. 29 is a plot of the sensed displacement of the shrinkage sensor verses time during the molding of PP.

The present invention may employ a real time control system to interface between the operator, the developed shrinkage analysis, and the developed shrinkage sensor. As shown in FIG. 29, the auxiliary controller may receive voltages corresponding to the strain and piezoelectric stress as a function of time. Given application-specific design information about the sensor, movable pin, and mold cavity, the controller may calculate the in-mold movable pin deflection, part dimension(s), cavity pressure, and shrinkage from the transfer functions given in equations (1) to (4). Given the volume of the short shot corresponding to the sensor location and the cavity wall thickness, mechanistic relations may be used to provide internal process states such as the flow rate, melt viscosity, volumetric shrinkage, and melt solidification time. With just the sensor and no external process information or constitutive models, the controller may provide better observability than most commercial systems used in industry.

Given additional information including the melt's constitutive model and process conditions, the described shrinkage analyses of equations (6) and (7) may be used to predict the final part dimensions relative to the part's specifications and thereby provide a reject signal. In addition, these same models may be used to synthesize the minimum and maximum control limits for each process set-point while holding the other process set-points at their current values. This information can be used by the operator to simultaneously adjust multiple set-points while maintaining the current part dimension or otherwise satisfy new dimensional specifications.

Implementation and Validation

Figure 28:
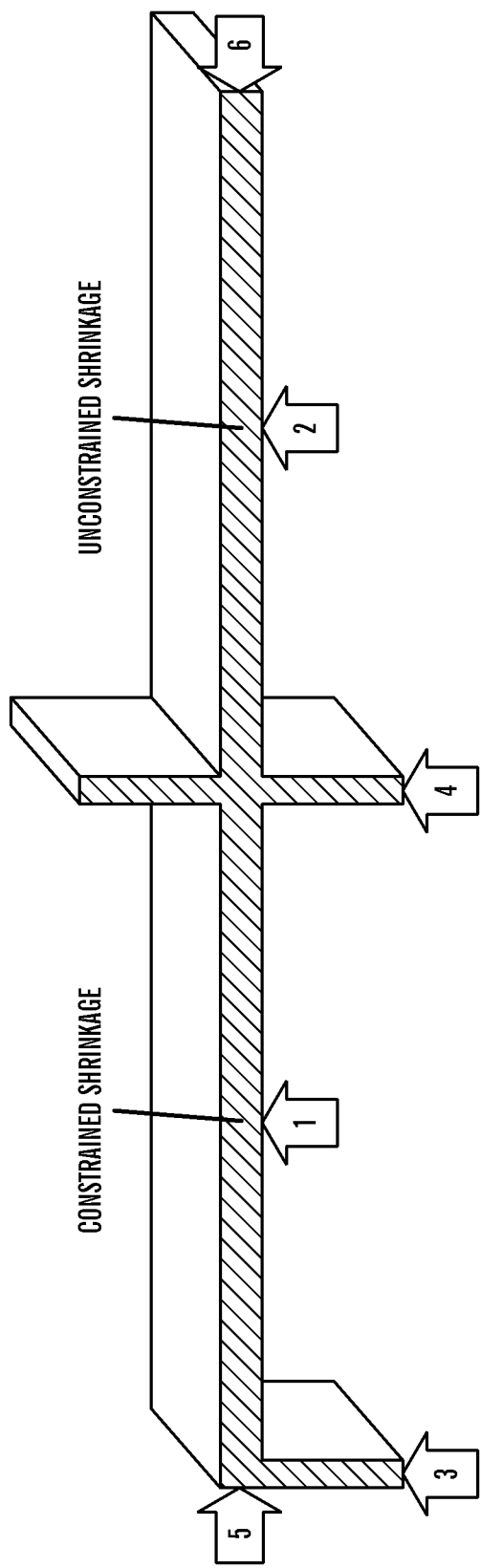
FIG. 28 is a cross-sectional view of a test specimen and measurement locations for a molded part in accordance with the present invention.

The present invention provides a complete instrumentation, analysis, and control system for managing the dimensions of molded parts. As previously discussed the performance of multiple sensor designs may be characterized in an inner array as a function of application characteristics in an outer array. Several sensors may be manufactured and installed in a mold according to the part design of FIG. 28. This configuration allows characterization of shrinkage in the thickness, width, and height directions for constrained and unconstrained geometries.

A button cell deflection sensor was designed, built, and wired with four strain gages connected in a full bridge. A movable pin is provided by an ejector pin positioned above the button cell similar to the configuration of FIG. 8. Experiments were conducted on a 100-ton hydraulic molding machine with a mold producing 2.5 mm plaques of different resins including PP and HIPS. Data was acquired from the shrinkage and other process sensors, and used to identify the arrival of melt at sensors in cavity, maximum shrinkage sensor position, shrinkage sensor position just prior to mold opening. FIG. 29 plots the sensed displacement of the shrinkage sensor during the molding of PP. The sensor begins at a position of 0.52 mm. At a time of 2 seconds, the melt reaches the sensor pushes it slightly downwards; the maximum downward displacement of the pin is 0.1 mm (a position of 0.42 mm from a starting position of 0.52 mm) at a time of 5 seconds. This time was verified to coincide with the maximum cavity pressure at this location during the packing stage of the mold cavity.

The increasing position of the shrinkage sensor in FIG. 29 after 5 seconds corresponds to later cooling and shrinkage of the polymer melt in the mold cavity. By a time of 15 seconds, the bulk of the polymer melt has solidified. At a time of 25 seconds, the mold is opened and the part is ejected. The in-mold shrinkage of the polymer melt is measured as the displacement of the shrinkage sensor from its minimum position at 5 seconds to its last position prior to mold opening at 25 seconds.

Figure 30:
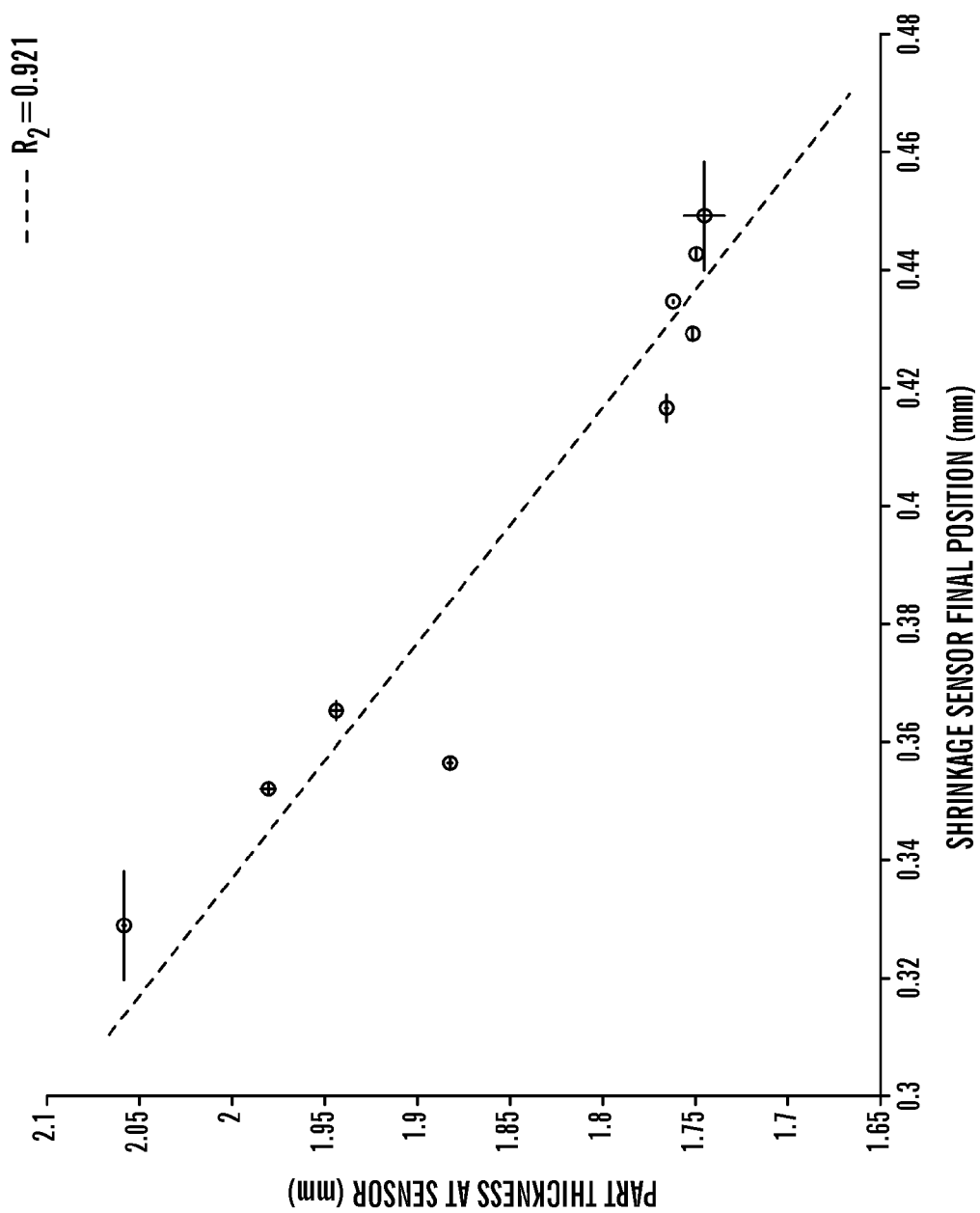
FIG. 30 is a graph of the results of the measured final part thickness against the observed in mold shrinkage as acquired according to the discussion of FIG. 29.

A design of experiments was conducted to characterize the performance of the sensor to predict final part dimensions at varying processing conditions. The results are provided in FIG. 30, which plots the measured final part thickness against the observed in mold shrinkage as acquired according to the discussion of FIG. 29. The results indicate that the described in-mold shrinkage sensor is an excellent predictor of final part thickness.

Figure 31:
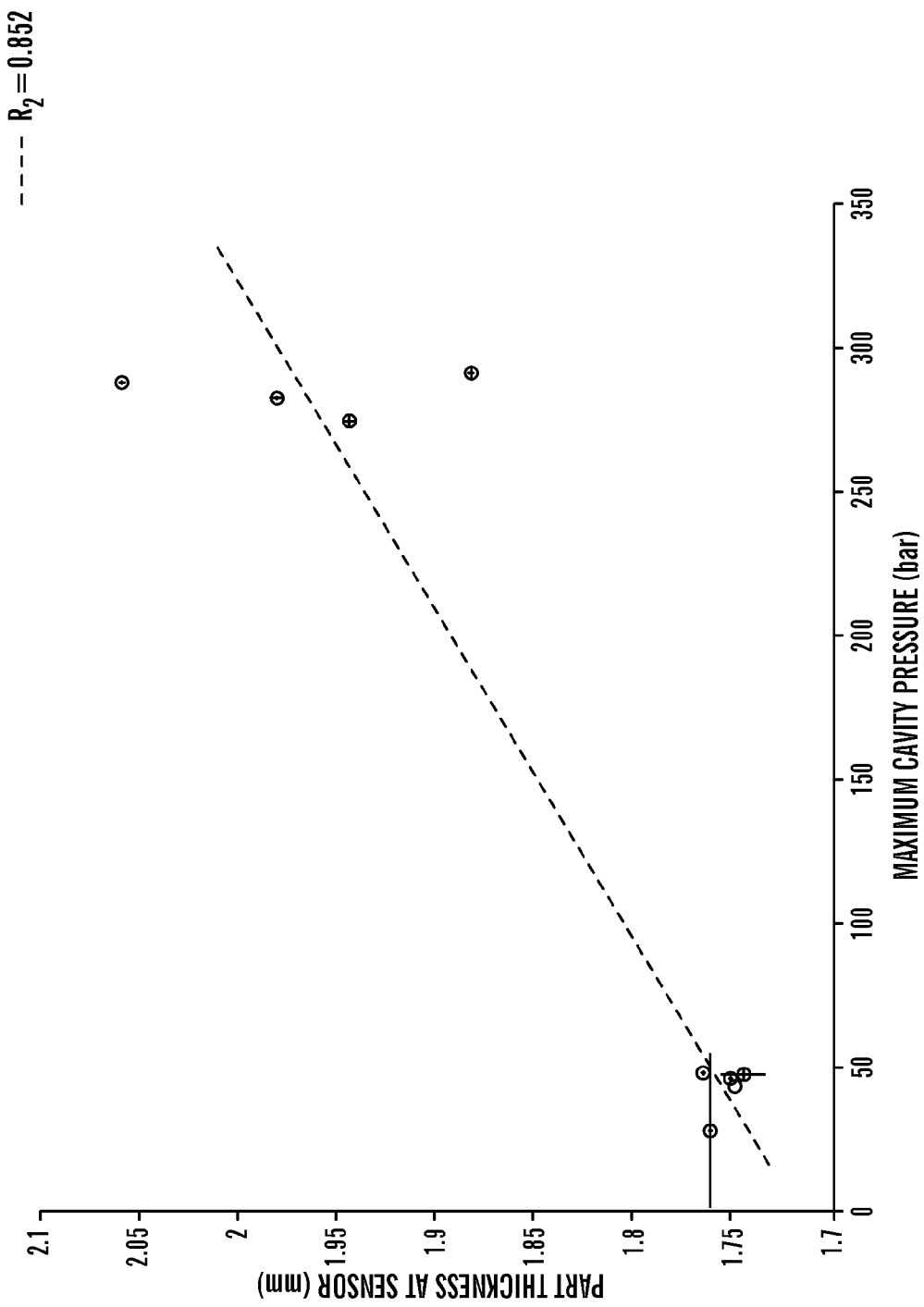
FIG. 31 is a graph of the measured final part thickness against the observed in-mold cavity pressure as acquired by a commercial, direct mount cavity pressure sensor.

For comparison purposes, FIG. 31 plots the measured final part thickness against the observed in-mold cavity pressure as acquired by a commercial, direct mount cavity pressure sensor. The results indicate that the correlation is not as good as that provided by the described shrinkage sensor. Part dimension measurements were also taken at locations remote to the in-mold shrinkage and cavity pressure sensors. In every case, it was found that the shrinkage sensor provided better correlation with the part measurements than the pressure sensor.

The present invention is a step forward from the current sensor designs that have been used for decades for monitoring injection molding. Direct measurement of the shrinkage, together with simple derivation of other process states such as flow rate and viscosity, enable the development and widespread implementation of improved process and quality control methods for injection molding. As a result, the time required for process set-up and stabilization is reduced, and part quality and consistency is improved. Due to savings associated with cycle time reductions, yield improvements, and related automation, there is the potential to significantly improve molding productivity.

It is noted that different sensor designs incorporating various shapes and sensing means may be implemented. For example, the position of the movable pin may be measured using at least one potentiometer, at least one inductance device, at least one magnetostrictive device, at least one optical encoder, and at least one laser interferometer.

Thus, while various embodiments of the present invention have been illustrated and described, it will be appreciated to those skilled in the art that many changes and modifications may be made thereunto without departing from the spirit and scope of the invention.

The invention claimed is:

1. A method for use in forming a molded part, the method comprising:
   providing a mold having a cavity and a movable pin, wherein the movable pin is movable with respect to a surface of the cavity from which the movable pin protrudes;
   injecting a moldable material into the cavity;
   biasing the movable pin to maintain an end of the movable pin in contact with the moldable material in the cavity during the curing of the moldable material and until the moldable material is cured; and
   monitoring movement of the biased movable pin with a sensing device during curing of the moldable material in the mold.

2. The method of claim 1 further comprising controlling the forming of a plurality of the parts based on the monitored movement of the biased movable pin.

3. The method of claim 1 further comprising monitoring the biasing force exerted on the movable pin by the moldable material during curing of the moldable material in the mold.

4. The method of claim 3 further comprising controlling the forming of a plurality of the parts based on the monitored movement of the biased movable pin and the monitored biasing force exerted on the movable pin.

5. The method of claim 1 further comprising monitoring the biasing force exerted on the movable pin by the moldable material during curing of the moldable material in the mold, and monitoring the temperature of the moldable material at the end of the movable pin during curing of the moldable material.

6. The method of claim 5 further comprising controlling the forming of a plurality of the parts based on the monitored movement of the biased movable pin, the monitored biasing force exerted on the movable pin, and the monitored temperature of the moldable material.

7. The method of claim 1 wherein the monitoring the movement of the movable pin comprises using a displacement transducer.

8. The method of claim 7 wherein the displacement transducer comprises at least one of a strain gage, a capacitive displacement transducer, and a piezoelectric cell.

9. The method of claim 1 wherein the biasing the movable pin comprising applying the biasing force using at least one of a diaphragm, a coil spring, and an elastic member.

10. The method of claim 1 further comprising monitoring a biasing force exerted on the movable pin during the curing of the moldable material with at least one of a strain gage and a piezoelectric element.

11. The method of claim 1 wherein the movable pin comprises a movable ejector pin.

12. The method of claim 1, wherein the biasing of the movable pin causes the movable pin to move to maintain an end of the movable pin in contact with the moldable material when a pressure of the moldable material is zero.

13. A sensor for use in forming of a moldable part in a cavity of a mold, said sensor comprising:
   a housing connectable to the mold;
   a movable pin disposed in said housing, said movable pin having an end engageable with a moldable material in the cavity of the mold, wherein the movable pin is movable with respect to a surface of the cavity from which the movable in protrudes;
   an elastic member supported in said housing and engageable with said movable pin for applying a biasing force on said end of said movable pin to maintain said end of said movable pin in contact with the moldable material in the cavity during curing of the moldable material and until the moldable material is cured; and
   a sensing device to monitor movement of said movable pin when said movable pin is in contact with the moldable material during curing of the moldable material in the cavity.

14. The sensor of claim 13 wherein the sensing device comprises at least one strain gage operably connected to said elastic member.

15. The sensor of claim 13 wherein the sensing device comprises a capacitive device.

16. The sensor of claim 13 wherein the sensing device comprises a piezoelectric element.

17. The sensor of claim 13 wherein said elastic member comprises a diaphragm.

18. The sensor of claim 13 wherein said elastic member comprises at least one coil spring.

19. The sensor of claim 13 wherein said elastic member comprises a resilient sleeve.

20. The sensor of claim 13 further comprising means for monitoring a biasing force exerted on said movable pin by the moldable material during curing of the moldable material in the cavity during curing of the moldable material.

21. The sensor of claim 20 wherein the means for monitoring a biasing force comprises a piezoelectric element.

22. The sensor of claim 20 wherein the means for monitoring a biasing force comprises a strain gage.

23. The sensor of claim 13 further comprising means for monitoring a temperature of the moldable material at the end of the movable pin during curing of the moldable material.

24. The sensor of claim 13 wherein the means for monitoring a temperature of the moldable material at the end of the movable pin comprises a thermocouple.

25. The sensor of claim 13, wherein the elastic member applies the biasing force on said end of said movable pin to maintain said end of said movable pin in contact with the moldable material when a pressure of the moldable material is zero.

26. A method for controlling the forming of a plurality of molded parts in a cavity of a mold, the method comprising:
   monitoring, using a sensing device, at least one of an in-mold part dimension of a part and in-mold shrinkage of a part based on movement of a movable pin biased to maintain an end of the movable pin in contact with moldable material in the cavity during curing of the moldable material until the moldable material is cured, wherein the movable pin is movable with respect to a surface of the cavity from which the movable pin protrudes; and controlling a plurality of operating parameters for forming the plurality of molded parts based on the monitored at least one of the in-mold part dimension of the part and the in-mold shrinkage of the part.

27. The method of claim 26 further comprising monitoring a biasing force exerted on the movable pin by the moldable material, and the controlling further comprises controlling the plurality of operating parameters for forming the plurality of molded parts based on the monitored at least one of the in-mold part dimension of the part and in-mold shrinkage of a part, and the monitored biasing force exerted on the movable pin by the moldable material.

28. The method of claim 27 further comprising monitoring a temperature of the moldable material at the end of the movable pin during curing of the moldable material, and the controlling further comprises controlling the plurality of operating parameters for forming the plurality of molded parts based on the monitored at least one of the in-mold part dimension of the part and in-mold shrinkage of a part, the monitored biasing force exerted on the movable pin by the moldable material, and the monitored temperature of the moldable material at the end of the movable pin.

29. The method of claim 28 wherein the controlling the plurality of operating parameters comprises controlling the plurality of operating parameters comprising at least some of a pressure of the molded material, a temperature of the molded material, a temperature of the mold, a clamp force applied to the mold, a cycle time for forming the plurality of parts, material properties of the moldable material, a cooling of the mold, and a flow rate of the moldable material.

30. A system for controlling the forming of a plurality of molded parts in a cavity of a mold, the system comprising:

a sensor for monitoring at least one of an in-mold part dimension and an in-mold shrinkage of the part based on movement of a movable pin biased to maintain an end of the movable pin in contact with moldable material in the cavity during curing of the moldable material until the moldable material is cured, wherein the movable pin is movable with respect to a surface of the cavity from which the movable pin protrudes; and a processor operable to control a plurality of operating parameters for forming the plurality of molded parts based on the monitored at least one of the in-mold part dimension of the part and the in-mold shrinkage of the part.

31. The system of claim 30 wherein said sensor is operable for monitoring a biasing force exerted on the movable pin by the moldable material during curing of the moldable material until the moldable material is cured, and the processor is operable to control the plurality of operating parameters for forming the plurality of molded parts based on the monitored in-mold part dimension and the monitored biasing force exerted on the movable pin by the moldable material.

32. The system of claim 31 wherein said sensor is operable for monitoring a temperature of the moldable material at the end of the movable pin during curing of the moldable material, and the processor is operable to control the plurality of operating parameters for forming the plurality of molded parts based on the monitored at least one of the in-mold part dimension of the part and in-mold shrinkage of a part, the monitored biasing force exerted on the movable pin by the moldable material, and the monitored temperature of the moldable material at the end of the movable pin.

33. The system of claim 32 wherein the processor is operable to control the plurality of operating parameters comprising at least some of a pressure of the molded material, a temperature of the molded material, a temperature of the mold, clamp force applied to the mold, a cycle time for forming the plurality of parts, a material properties of the moldable material, a cooling of the mold, and a flow rate of the moldable material.

34. An article of manufacture comprising:

at least one computer usable medium having computer readable program code logic to control the forming of a plurality of molded parts in a cavity of a mold, said computer readable program code logic when executing performing the following:

obtaining, using a sensing device, at least one of an in-mold dimension of the part and an in-mold shrinkage of the part based on monitoring a movable pin biased to maintain the end of the movable pin in contact with moldable material in the cavity during curing of the moldable material until the moldable material is cured, wherein the movable pin is movable with respect to a surface of the cavity from which the movable pin protrudes; and controlling a plurality of operating parameters for forming the plurality of molded parts based on the monitored at least one of the in-mold dimension of the part and the in-mold shrinkage of the part.

35. The article of manufacture of claim 34 wherein said sensor is operable for monitoring a biasing force exerted on the movable pin by the moldable material during curing of the moldable material until the moldable material is cured, and the processor is operable to control the plurality of operating parameters for forming the plurality of molded parts based on the monitored in-mold part dimension and the monitored biasing force exerted on the movable pin by the moldable material.

36. The article of manufacture of claim 35 wherein said sensor is operable for monitoring a temperature of the moldable material at the end of the movable pin during curing of the moldable material, and the processor is operable to control the plurality of operating parameters for forming the plurality of molded parts based on the monitored at least one of the in-mold part dimension of the part and in-mold shrinkage of a part, the monitored biasing force exerted on the movable pin by the moldable material, and the monitored temperature of the moldable material at the end of the movable pin.

37. The article of manufacture of claim 36 wherein the processor is operable to control the plurality of operating parameters comprising at least some of a pressure of the molded material, a temperature of the molded material, a temperature of the mold, clamp force applied to the mold, a cycle time for forming the plurality of parts, a material properties of the moldable material, a cooling of the mold, and a flow rate of the moldable material.

* * * * *